US012273343B2

(12) United States Patent
Wilson et al.

(10) Patent No.: US 12,273,343 B2
(45) Date of Patent: Apr. 8, 2025

(54) TECHNIQUES FOR DYNAMICALLY ASSIGNING CLIENT CREDENTIALS TO AN APPLICATION

(71) Applicant: Oracle International Corporation, Redwood Shores, CA (US)

(72) Inventors: Gregg Alan Wilson, Austin, TX (US); Venkata Subbarao Evani, Fremont, CA (US); Martinus Petrus Lambertus van den Dungen, Snohomish, WA (US); Girish Nagaraja, Sammamish, WA (US); Gary Philip Cole, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 270 days.

(21) Appl. No.: 18/048,710

(22) Filed: Oct. 21, 2022

(65) Prior Publication Data

US 2023/0132934 A1  May 4, 2023

Related U.S. Application Data

(60) Provisional application No. 63/275,613, filed on Nov. 4, 2021.

(51) Int. Cl.
*G06F 7/04* (2006.01)
*H04L 9/40* (2022.01)

(52) U.S. Cl.
CPC ...... *H04L 63/0876* (2013.01); *H04L 63/0807* (2013.01)

(58) Field of Classification Search
CPC . H04L 63/0876; H04L 9/0866; H04L 63/087; G06F 21/44
See application file for complete search history.

(56) References Cited

U.S. PATENT DOCUMENTS 8,856,905 B2   10/2014   Lundblade
9,225,532 B2   12/2015   Counterman
(Continued)

FOREIGN PATENT DOCUMENTS

CN   108322471 B   4/2019
CN   108337260 B   4/2019
(Continued)

OTHER PUBLICATIONS

Zhang et al., Security Enforcement Model for Distributed Usage Control, Jun. 13, 2008, IEEE, pp. 10-18. (Year: 2008).*

(Continued)

*Primary Examiner* — Philip J Chea
*Assistant Examiner* — Jenise E Jackson
(74) *Attorney, Agent, or Firm* — Kilpatrick Townsend & Stockton LLP

(57) ABSTRACT

An identity management and authorization system (IMAS) receives a request to download an application to a user device associated with a user. The IMAS downloads, to the user device, a template application instance corresponding to the requested application, the template application instance having a reduced functionality than the requested application. The IMAS receives, from the user device, a request to register to the downloaded template. Responsive to receiving the request to register the application, the IMAS causes the template application instance on the user device to transition to an application instance of the application with full functionality, generates an application instance-specific credential for the application instance, associates the generated application instance-specific credential with the application instance, and stores the application instance-specific credential in association with (1) an application identifier identifying the application instance, (2) a user
(Continued)

identifier identifying the user, and (3) a user device identifier identifying the user device.

20 Claims, 16 Drawing Sheets

(56) References Cited

U.S. PATENT DOCUMENTS

| | | | |
|---|---|---|---|
| 9,305,000 B1* | 4/2016 | Bandopadhyay | G06F 16/13 |
| 9,781,122 B1 | 10/2017 | Wilson et al. | |
| 9,787,665 B2 | 10/2017 | Korat et al. | |
| 9,838,376 B1 | 12/2017 | Lander et al. | |
| 9,838,377 B1 | 12/2017 | Lander et al. | |
| 10,044,695 B1* | 8/2018 | Cahill | G06F 21/44 |
| 10,200,358 B2 | 2/2019 | Lander et al. | |
| 10,218,705 B2 | 2/2019 | Wilson et al. | |
| 10,255,061 B2 | 4/2019 | Lander et al. | |
| 10,261,836 B2 | 4/2019 | Bansal et al. | |
| 10,263,947 B2 | 4/2019 | Vats et al. | |
| 10,341,410 B2 | 7/2019 | Lander et al. | |
| 10,348,858 B2 | 7/2019 | Theebaprakasam et al. | |
| 10,425,386 B2 | 9/2019 | Wardell et al. | |
| 10,445,395 B2 | 10/2019 | Carru et al. | |
| 10,454,915 B2 | 10/2019 | Mohamad Abdul et al. | |
| 10,454,940 B2 | 10/2019 | Lander et al. | |
| 10,484,243 B2 | 11/2019 | Cole et al. | |
| 10,484,382 B2 | 11/2019 | Wilson et al. | |
| 10,505,941 B2 | 12/2019 | Vats et al. | |
| 10,511,589 B2 | 12/2019 | Gangawane et al. | |
| 10,516,672 B2 | 12/2019 | Gupta et al. | |
| 10,530,578 B2 | 1/2020 | Keshava et al. | |
| 10,567,364 B2 | 2/2020 | Vats et al. | |
| 10,579,367 B2 | 3/2020 | Lander et al. | |
| 10,581,820 B2 | 3/2020 | Keshava et al. | |
| 10,585,682 B2 | 3/2020 | Jain et al. | |
| 10,594,684 B2 | 3/2020 | Bansal et al. | |
| 10,616,224 B2 | 4/2020 | Subramanian et al. | |
| 10,693,861 B2 | 6/2020 | Lander et al. | |
| 10,715,564 B2 | 7/2020 | Mohamad Abdul et al. | |
| 10,721,237 B2 | 7/2020 | Vats et al. | |
| 10,735,394 B2 | 8/2020 | Gupta et al. | |
| 10,764,273 B2 | 9/2020 | Mohamad Abdul et al. | |
| 10,791,087 B2 | 9/2020 | Medam et al. | |
| 10,798,165 B2 | 10/2020 | Srinivasan et al. | |
| 10,831,789 B2 | 11/2020 | Srinivasan et al. | |
| 10,834,137 B2 | 11/2020 | Pitre et al. | |
| 10,846,390 B2 | 11/2020 | Subramanian et al. | |
| 10,848,543 B2 | 11/2020 | Lander et al. | |
| 10,878,079 B2 | 12/2020 | Vepa et al. | |
| 10,904,074 B2 | 1/2021 | Wilson et al. | |
| 10,931,656 B2 | 2/2021 | Carru et al. | |
| 11,023,555 B2 | 6/2021 | Carru et al. | |
| 11,061,929 B2 | 7/2021 | Xu et al. | |
| 11,088,993 B2 | 8/2021 | Wardell et al. | |
| 11,165,634 B2 | 11/2021 | Medam et al. | |
| 11,308,132 B2 | 4/2022 | Srinivasan et al. | |
| 11,321,343 B2 | 5/2022 | Srinivasan et al. | |
| 11,669,321 B2 | 6/2023 | Srinivasan et al. | |
| 2009/0292545 A1* | 11/2009 | Mohammed | G06Q 30/0611 |
| | | | 705/304 |
| 2013/0254125 A1* | 9/2013 | Sanders | G06Q 30/06 |
| | | | 726/4 |
| 2014/0337525 A1* | 11/2014 | Branton | H04L 67/34 |
| | | | 709/225 |
| 2017/0078886 A1* | 3/2017 | Raleigh | H04W 12/086 |
| 2017/0150332 A1* | 5/2017 | Palanisamy | H04W 4/70 |
| 2020/0084281 A1* | 3/2020 | Ley | H04L 67/141 |
| 2021/0081252 A1 | 3/2021 | Bhargava et al. | |
| 2021/0084031 A1 | 3/2021 | Lao et al. | |

FOREIGN PATENT DOCUMENTS

| | | |
|---|---|---|
| CN | 108322472 B | 6/2019 |
| CN | 107852417 B | 4/2021 |
| CN | 109639687 B | 5/2021 |
| CN | 109565505 B | 6/2021 |
| CN | 109314704 B | 7/2021 |
| DE | 102017003243 B4 | 10/2018 |
| EP | 3311548 B1 | 4/2019 |
| EP | 3361702 B1 | 10/2019 |
| EP | 3528454 B1 | 8/2020 |
| EP | 3494683 B1 | 11/2020 |
| EP | 3577885 B1 | 5/2021 |
| EP | 3361700 B1 | 8/2021 |
| EP | 3361701 B1 | 9/2021 |
| JP | 6491381 B2 | 3/2019 |
| JP | 6491774 B2 | 3/2019 |
| JP | 6491796 B2 | 3/2019 |
| JP | 6917331 B2 | 7/2021 |
| KR | 101871902 B1 | 6/2018 |
| KR | 101873941 B1 | 7/2018 |
| KR | 101874384 B1 | 7/2018 |
| KR | 102041941 B1 | 11/2019 |

OTHER PUBLICATIONS

Koenen et al., The Long March to Interoperable Digital Rights Management, Jun. 30, 2004, IEEE, pp. 883-897. (Year: 2004).*
Manage Instance ID Data, Feb. 3, 2022, 4 pages, https://firebase.google.com/support/privacy/manage-iids.
Client Credentials Flow, Feb. 3, 2022, 1 page, https://auth0.com/docs/get-started/authentication-and-authorization-flow/client-credentials-flow.
Client Credentials, Feb. 3, 2022, 2 pages, https://www.oauth.com/oauth2-servers/access-tokens/clients-credentials/.
What is Instance ID?, Feb. 1, 2022, 4 pages. https://developers.google.com/instance-id.
Using an IAM role to grant permissions to applications running on Amazon EC2 instances, 2022, 8 pages, https://docs.aws.amazon.com/IAM/latest/UserGuide/id_roles_use_switch-role-ec2.html.
Ye, et al., How to dynamically generate GCP IAM credentials with a new HashiCorp Vault secrets engine, Apr. 10, 2018, 5 pages, https://cloud.google.com/blog/products/identity-security/how-you-and-wepay-can-use-hashicorp-vault.
Dynamic Client Registration API, 2021, 25 pages, https://developer.okta.com/docs/reference/api/oauth-clients/.
Farrell, OAuth: Dynamic Client Registration, IBM Security Identity and Access, Jun. 18, 2018, 12 pages, https://www.ibm.com/blogs/security-identity-access/oauth-dynamic-client-registration/.

* cited by examiner

1000 (e.g. 730)

1010
The IMAS receives a user identifier identifying a user and a request to deactivate application instances associated with the user

1020
The IMAS identifies, in a memory, application instance identifiers associated with the user identifier and application instance-specific credentials associated with each of the identified application instance identifiers

1030
The IMAS deletes the application instance-specific credentials identified in 1020 from the memory

1110
The IMAS receives a service identifier identifying an application and a request to deactivate application instances of an application identified by the service identifier 1120
The IMAS deletes, from a memory, the service identifier

FIG. 11

TECHNIQUES FOR DYNAMICALLY ASSIGNING CLIENT CREDENTIALS TO AN APPLICATION

CROSS-REFERENCE TO RELATED APPLICATION

This application claims priority to U.S. Provisional Application No. 63/275,613 filed on Nov. 4, 2021 and entitled "Techniques for Dynamically Assigning Client Credentials to an Application," the entire contents of which are incorporated herein by reference for all purposes.

TECHNICAL FIELD

This disclosure generally relates to generation and use of client/application credentials. More specifically, but not by way of limitation, this disclosure describes techniques for dynamically generating and associating client/application credentials for specific application instances.

BACKGROUND

In addition to user credentials, such as username and password, various protocols (e.g., OICD/OAuth Open ID Connect/Open Authorization) that are used to control access to resources use application-specific credentials as part of their authorization flows. The application is commonly referred to a client and the application-specific credentials are commonly referred to as client credentials. Examples of these application/client credentials include a client identifier (clientID) that is generated for and identifies the application and a client secret that is known by only the application and a backend authorization server that is configured to perform authorization-related processing when a request to access a resource or perform some function is received from the application.

Managing user credentials and application/client credentials becomes laborious and unmanageable in situations where there are a large number of users and applications used by the users. For example, thousands or even millions of users may download and install instances of the same application (e.g., a mobile application) on their user devices (e.g., on smart phones, tablets, or other mobile devices). In such situations, managing the user credentials and application/client credentials for multiple downloaded instances of the application can become a problem.

SUMMARY

The present disclosure generally relates to generation and use of client/application credentials. More specifically, but not by way of limitation, this disclosure describes techniques for dynamically generating and associating client/application credentials for specific application instances. Various inventive embodiments are described herein, including methods, systems, non-transitory computer-readable storage media storing programs, code, or instructions executable by one or more processors, and the like.

Techniques are described for dynamically generating and associating client/application credentials for specific application instances. An identity management and access system (IMAS) is described that is configured to generate and associate client/application credentials for a downloaded instance of an application. The IMAS is implemented using one or more computing systems. In certain embodiments, the IMAS receives a request to download an application to a user device associated with a user. The IMAS downloads, to the user device, a template application instance corresponding to the requested application, the template application instance having a reduced functionality than the requested application. The IMAS receives, from the user device, a request to register the downloaded template application instance. Responsive to receiving the request to register the application, the IMAS causes the template application instance on the user device to transition to an application instance of the application with full functionality, generates an application instance-specific credential for the application instance, associates the generated application instance-specific credential with the application instance, and stores the application instance-specific credential in association with (1) an application identifier identifying the application instance, (2) a user identifier identifying the user, and (3) a user device identifier identifying the user device.

In certain embodiments, the application instance-specific credential is used in an access workflow initiated in response to a request by the application instance to access a protected resource.

In certain embodiments, using the application instance-specific credential in an access flow includes receiving from the application instance, the application instance-specific credential and a request for an access token. Responsive to verifying the application instance-specific credentials, the IMAS generates the access token. The IMAS transmits, to the application instance, the access token. The application instance can use the access token to request or otherwise access data from a third party system.

In certain embodiments, the request for the access token includes scope information identifying a scope of data requested from the third party system. The generated access token includes the scope information. The application instance can use the access token to request or otherwise access the scope of data from the third party system.

In certain embodiments, the IMAS receives, from a computing system, an application instance identifier and a request to deactivate the application instance. The IMAS identifies, in a memory, based on the received application instance identifier, the application instance-specific credential. The IMAS deletes the stored application instance-specific credential from the memory.

In certain embodiments, the IMAS receives, from the application instance, an access request including the application instance-specific credential Responsive to not identifying the application instance-specific credential in the memory, the IMAS ceases a communication with the application instance.

In certain embodiments, the IMAS receives, from a computing system, the application identifier and a request to disable all application instances associated with the application identifier. Responsive to receiving the request, the IMAS deletes, from a memory, the application identifier.

In certain embodiments, the memory stores other application instance-specific credentials of one or more other application instances associated with the user, the application instance-specific credentials of each of the one or more other application instances stored in the memory in association with the user identifier identifying the user. The IMAS receives from a computing system, the user identifier and a request to disable all application instances associated with the user identifier. The IMAS, responsive to receiving the request, deletes, from the memory and based on the user identifier, the application instance specific credentials of the instance and the other application instance specific credentials of each of the one or more other application instances.

In certain embodiments, the memory stores other application instance-specific credentials of one or more other application instances associated with the user device, the application instance-specific credentials of each of the one or more other application instances stored in the memory in association with the user device identifier. The IMAS receives, from a computing system, the user device identifier and a request to disable all application instances associated with the user device identifier. Responsive to receiving the request, the IMAS deletes, from the memory and based on the user device identifier, the application instance specific credentials of the instance and the other application instance specific credentials of each of the one or more other client application instances.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 10 is a block flow diagram depicting processing performed by an IMAS to deactivate application instances associated with a user, according to certain embodiments.

FIG. 11 is a block flow diagram depicting processing performed by an IMAS to deactivate all application instances associated with an application, according to certain embodiments.

DETAILED DESCRIPTION

Figure 1:
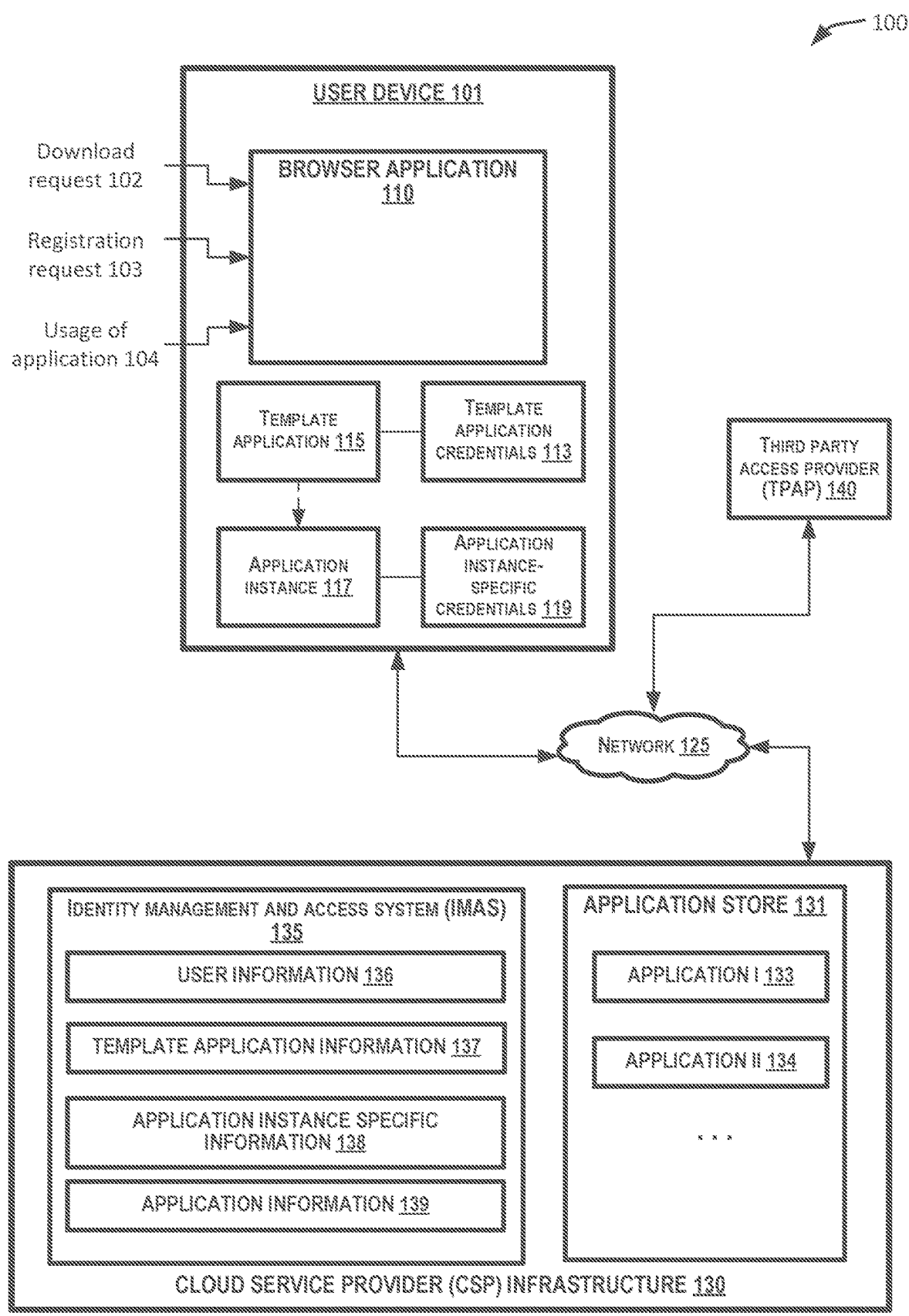
FIG. 1 is a simplified block diagram of a computing environment, incorporating an identity management and authorization system (IMAS), for generating and assigning application instance-specific credentials to an application instance, according to certain embodiments.

In the following description, for the purposes of explanation, specific details are set forth to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure generally relates to generation and use of client/application credentials. More specifically, but not by way of limitation, this disclosure describes techniques for dynamically generating and associating client/application credentials for specific application instances.

A user registers an application instance before it can be used. As part of the processing performed for registering the application instance, the user downloads a template version of the application (a "template application") on the user device. The template application, in some instances, can perform functions limited to communicating with the IMAS to perform a registration flow to register an application instance. Upon performing the registration flow, the template application acquires a full set of functions (e.g. including ability to perform access flows) and transitions to being an instance of the application having full functionality. During the registration flow, the user is authenticated and upon successful user authentication, application instance-specific credentials are dynamically generated for that application instance and associated with that application instance. For example, the client credentials may be generated by an identity management and access system (IMAS) that is configured to perform various authentication and access functions. As a result of the generation and association of the instance-specific client credentials, the full functionality of the application instance is enabled or unlocked In other words, the template application having limited functionality becomes the application instance having the full functionality. The full functionality of the application instance includes operations for using the dynamically generated application instance-specific client credentials to participate in various authentication and/or authorization flows such as OIDC (OpenID Connect) flows, OAuth (Open Authentication) flows, and other authentication or authorization flow protocols.

In certain embodiments, a user may download and register application instances on various devices. Application instance-specific credentials may be generated on a per user and per device basis. The IMAS generating the application instance-specific credentials may store information associating the user, user credentials, the application instance, the user device, and the application instance-specific credentials generated for and associated with that application instance. This information can be then used for a various different purposes. For example, the information may be used to easily and efficiently deactivate a specific application instance (e.g., an application instance on a particular device), deactivate a particular user and all application instance associated with that particular user (e.g. on multiple user devices), deactivate a particular user device and all application instances (e.g. associated with multiple applications) associated with that user device, deactivate all instances of an application associated with multiple users, and the like.

Example of an Identity Management and Access System

A cloud service provider (CSP) may provide multiple cloud services to subscribing customers. These services may be provided under different models including a Software-as-a-Service (SaaS), Platform-as-a-Service (PaaS), an Infrastructure-as-a-Service (IaaS) model, and others.

In the cloud environment, an identity management and access system (IMAS) is generally provided by the CSP to control user access to resources provided or used by a cloud service. Typical services or functions provided by an identity management system include, without restriction, single-sign on capabilities for users, authentication and access services, and other identity-based services.

The resources that are protected by an identity management system can be of different types such as compute instances, block storage volumes, virtual cloud networks (VCNs), subnets, route tables, various callable APIs, internal or legacy applications, and the like. These resources include resources stored in the cloud and/or customer on-premise resources. Each resource is typically identified by a unique identifier (e.g., an ID) that is assigned to the resource when the resource is created.

A CSP may provide two or more two separate and independent identity management systems for their cloud offerings. This may be done, for example, where a first identity management system or platform (e.g., Infrastructure Identity and Access Management (IAM)) may be provided for controlling access to cloud resources for IaaS applications and services provided by the CSP. Separately, a second identity management system or platform (e.g., Identity Cloud Services (IDCS)) may be provided for security and identity management for SaaS and PaaS services provided by the CSP.

As a result of providing such two separate platforms, if a customer of the CSP subscribes to both a SaaS or PaaS service and an IaaS service provided by the CSP, the customer generally has two separate accounts—one account with IAM for the IaaS subscription and a separate account with IDCS for the PaaS/SaaS subscription. Each account will have its own credentials, such as user login, password, etc. The same customer thus has two separate sets of credentials for the two accounts. This results in an unsatisfactory customer experience. Additionally, having two separate identity management system also creates obstacles for interactions between SaaS/PaaS and IaaS services.

For purposes of this application, and as an example, the two platforms are IAM and IDCS. These names and terms are however not intended to be limiting in any manner. The teachings of this disclosure apply to any situation where two (or more) different identity management systems are to be integrated. The identity management systems or platforms to be integrated may be provided by one or more CSPs.

In certain embodiments, an integrated identity management platform (referred to as Integrated Identity Management System (IMAS)) is provided that integrates the multiple identity management platforms (e.g., IAM and IDCS platforms) in a manner that is transparent to the users or customers of the cloud services while retaining and offering the various features and functionalities offered by the two separate (e.g., IAM and IDCS) platforms. The integration thus provides a more seamless and enhanced user experience.

This integration however is technically very difficult for several reasons. The two platforms may use different procedures and protocols for implementing the identity-related functions. IAM may, for example, be an attribute-based access control (ABAC) system, also known as policy-based access control system, which defines an access control paradigm whereby access rights are granted to users through the use of policies that express a complex Boolean rule set that can evaluate many different attributes. The purpose of ABAC is to protect objects such as data, network devices, and IT resources from unauthorized users and actions—those that don't have "approved" characteristics as defined by an organization's security policies. On the other hand IDCS may be a role-based access control (RBAC) system which is a policy-neutral access-control mechanism defined around roles and privileges. The components of RBAC such as role-permissions, user-role and role-role relationships make it simple to perform user assignments. As yet another reason, the authentication and access frameworks or workflows (e.g., types of tokens that are used, different authentication frameworks such as OAUTH, etc.) used by the two platforms may be different. This is just a small sampling of reasons why providing an integrated solution is technically very difficult.

In certain embodiments, an IMAS is described that is capable of dynamically generating and associating application instance-specific client credentials with application instances, as described herein.

Dynamic Generation of Application Instance-Specific Credentials

As indicated in the Background section, managing user credentials and application/client credentials can become laborious and unmanageable in situations where there are a large number of users and applications used by the users. For example, thousands or even millions of users may download and install instances of the same application (e.g., a mobile application) on their user devices (e.g., on smart phones, tablets, or other mobile devices). In such situations, managing the user credentials and application/client credentials for each of these multiple downloaded instances of the application can become a problem.

This problem is especially applicable to mobile applications as compared to web applications. A web application is generally deployed on a server, and the same instance of the web application can service multiple users. As a result, the need for multiple instances of the web application does not typically arise. However, for mobile applications, each user can download an instance of the application (or multiple instances for multiple devices of the user), and there could be millions of such users, and thus millions or even more of instances of the same mobile application that are downloaded and installed by users on user devices. There are various examples of such applications, such as banking applications, applications provided by cloud service providers (CSP) for various services offered by the CSP, and others.

In the past, one solution for tackling this problem has been to use the same client credentials for all instances of an application. While this reduces the number of client credentials that have to be managed, it severely reduces the security of the application instances and makes them vulnerable to hacking and malicious activities. For example, if the "same" client credentials are hacked or known, all instances of the application are compromised. At the other extreme, an authorization system may maintain multiple application instances and assign client credentials to them a priori to their use, i.e., before the application instances are used or downloaded by users. This a priori method is also problematic.

The dynamic client credential generation techniques described in this disclosure provide a solution to these problems. In certain implementations, an identity management and access system such as IMAS is configured to generate and assign application instance—specific to an application instance during the registration process for the application instance after successful user authentication. The specific set of credentials generated by IMAS for an application instance is then communicated to the downloaded instance of the application (the template application instance) being registered. For example, a user may download an instance of a mobile application to the user's device. There are no application instance specific credentials associated with the application instance prior to the download. When initially downloaded, the mobile application instance operates in a limited functionality mode (also called a "reduced functionality" mode or "template" mode) where its functionality is limited to a specific subset of a full set of functions. The specific subset of functions includes functions that are used for registering the application instance such as the ability to communicate with the IMAS to perform the initial registration flow to request specific access credentials.

The dynamic credential generation techniques described in this disclosure provide a solution to these problems. In certain implementations, the IMAS is configured to generate and assign application instance—specific to an application instance during the registration process for the application instance after successful user authentication. The specific set of credentials generated by the IMAS for an application instance is then communicated to the downloaded instance of the application (the template application instance) being registered. For example, a user may download an instance of a mobile application to the user's device. There are no application instance specific credentials associated with the application instance prior to the download. When initially downloaded, the mobile application instance operates in a limited functionality mode (also called a "reduced functionality" mode or "template" mode) where its functionality is limited to a specific subset of a full set of functions. The specific subset of functions includes functions that are used for registering the application instance such as the ability to communicate with the IMAS to perform the initial registration flow to request specific access credentials.

The IMAS is also configured to store information associating the user, user credentials, the application instance, the user device, and the credentials generated for and associated with that application instance. In certain implementations, the application itself, not its instances, may be identified using an application identifier (application ID). Associations may be stored between the application ID and various credentials (application instance-specific credentials, user device identifier, user identifier, template application identifier). This information can be then used for various different purposes. For example, the information may be used to easily and efficiently deactivate a specific application instance (e.g., an application instance on a particular device), deactivate a particular user and all application instance associated with that particular user, deactivate all instances of the applications associated with multiple users, and the like.

The application instance-specific credentials that are generated can come in different forms. In certain implementations, the application instance-specific credentials include a clientID and a secret. The clientID is an identifier for the application instance (sort of like an application instance keyed). The secret is a secret known only to the application and to the IMAS. The clientID and the secret are stored by the mobile application instance on the user deice on which the application instance is installed. In certain implementations, the application instance-specific credentials may be stored in encrypted form. The application instance-specific credentials are used to authenticate the application instance during resource access flows, such as during OIDC and OAuth flows.

The techniques described herein provide several technical advancement and improvements over conventional techniques. As described herein, client credentials are generated that are specific to each application instance, including for each application instance for each user device. This provides a significant improvement over prior art techniques that use the same client credentials for different instances of the same application. The techniques described herein thus provide for a more secure and robust implementation compared to conventional techniques. Further, by using the teachings described herein, the IMAS does not have to manage different application instances and assign client credentials to the instances prior to the use of the instances by user, for example, prior to an application instance being downloaded and installed by a user. This significantly reduces the management tasks for the IMAS.

Additionally, as described above, the IMAS stores information associating the user, user credentials, the application instance, the user device, and the client credentials generated for and associated with that application instance. Information may also be stored mapping an application ID (or templateAppID), which identifies the application and not the individual instances, to the client credentials, users, user devices, and the like. This information can be then used for a various different purposes. For example, the information may be used to easily and efficiently deactivate a specific application instance (e.g., an application instance on a particular device), deactivate a particular user and all application instance associated with that particular user, deactivate all instances of the applications associated with multiple users, and the like. For example, at the user device level, the client credentials associated with an application instance on that use device can be selectively disabled on a per user per device basis. For example, if the same user has downloaded the application on three separate devices, each downloaded application instance will have its unique application instance-specific credentials. One or more of these application instance-specific credentials can be selectively disabled by IMAS resulting in the associated application being disabled. At the user level, if the user is disabled/deleted/deactivated, then all the application instance-specific credentials associated with that user are also disabled/deactivated. This results in all the instances of the mobile application downloaded by the user to be disabled/deactivated. There may be situations where all instances of the application downloaded by one or more users need to be disabled or deactivated. In other words, the application itself is to be disabled. This may be done, for example, if a security vulnerability is discovered in the application and all the application instances that have been downloaded are to be disabled. In such a scenario, the application ID (or the templateAppID) may itself may be disabled or deactivated within IMAS. In response, all the client credentials associated with the application ID are also deactivated by the IMAS, So all the application credentials associated with the template application are disabled. The information stored by the IMAS regarding the various associations thus provides great flexibility in managing the application and its instances.

While the various examples described in this disclosure use mobile applications as examples of application instances for which client credentials are dynamically generated, this is not intended to be limiting. The teachings are not restricted to mobile application instances. The various techniques described herein can be used for any application where different instances of the application are used by users.

In certain embodiments, users can download instances of an application (e.g., a mobile application) on to their devices w (e.g., mobile devices) without the application instances having any a priori (i.e., prior to the download) associated application instance-specific credentials. These application instances have limited capabilities/functions and are referred to as "template" applications or application instances, to differentiate them from "normal" applications or application instances that have full functional capabilities. A template application instance is enabled to perform only a certain set of functions, which is just a small subset of the functions that the application instance can normally perform. A template application instance is an application instance that is configured to operate in a "limited functionality" mode in which only a small set of functions are enabled and a large set of functions, which the application instance could normally perform, are disabled or locked. Typically, the small set of functions that are enabled include functions that are used for registration of the application instance.

The present disclosure describes techniques for generating and associating application instance specific credentials with application instances.

FIG. 1 is a simplified block diagram of a computing environment 100, incorporating an identity management and authorization system (IMAS) 135, for generating and assigning application instance-specific credentials 119 to an application instance 117. In addition to the IMAS 135, computing environment 100 also comprises a user device 101, which includes a browser application 110. The user device 101 can download a template application 115 which, during a registration flow, can receive application instance-specific credentials 119 and transition to operating as an application instance 117. The computing environment 100 also comprises cloud services provider (CSP) infrastructure 130. Each of the systems depicted in FIG. 1 may comprise one or more subsystems and may communicate via a network 125. The various entities depicted in FIG. 1 may be implemented in software (e.g., code, computer readable instructions) that may be executed by one or more processors, in hardware, or combinations thereof. Computing environment 100 depicted in FIG. 1 is merely an example and is not intended to unduly limit the scope of claimed embodiments. One of ordinary skill in the art would recognize many possible variations, alternatives, and modifications. For example, in some implementations, environment 100 may have more or fewer systems or subsystems than those shown in FIG. 1, may combine two or more systems or subsystems, or may have a different configuration or arrangement of systems and subsystems.

In certain embodiments, the CSP infrastructure 130 comprises an identity management and access system (IMAS) 135. The IMAS 135 is a backend identity management and authentication/authorization system/service. In certain examples, the IMAS 135 generates application instance-specific credentials 119 that are specific to an application instance 117, for example, a client identifier ("client ID") and secret, which can be used by the application instance 117 to access a protected resource of a third party access provider (TPAP) 140 and/or of the CSP infrastructure 130. Further details describing a process for generating application instance-specific credentials 119 is described herein in FIG. 3. In certain examples, the IMAS 135 can provide, responsive to receiving the application instance-specific credentials 119 (e.g. client ID and secret) that are specific to the application instance 117, can provide access tokens to the application instance 117 to access one or more protected resources of another system (e.g. of the TPAP 140). Further details describing a process for granting, by the IMAS 135, an access token to the application instance 117 using the application instance-specific credentials 119 is described herein in FIG. 6. In certain examples, the IMAS 135 comprises or is otherwise communicatively coupled to a data storage unit and can access the data storage unit. In certain embodiments, prior to the user device 101 downloading the template application 115 (which later becomes the application instance 117) associated with a service application, the IMAS 135 stores, in the data storage unit, a template identifier ("template ID") and a service name identifier ("service name ID") associated with the service application (e.g. identifiers common to all downloaded template applications 115 and application instances 117 of the service application). In some embodiments, at a time of purchase or download of the template application 115, the IMAS 135 generates user credentials for the user associated with the user device 101 and stores the user credentials in the data storage unit.

As depicted in FIG. 1, the IMAS 135 can store and associate various associational information to log associations between users, user devices 101, downloaded template applications 115 and/or application instances 117, and service applications. For example, the IMAS 135 can store user information 136. The user information 136 can include a unique user identifier and user credentials (e.g. user name and password) assigned by the IMAS 135 to the user at a time of purchase of a service application. The user information 136 can also include associational information associating the user with one or more specific user devices 101 of the user, downloaded template applications 115, application instances 117 downloaded by the user (e.g. on various user devices 101, which may be associated with various service applications), or other user information 136. The IMAS 135 can store template application information 137, for example, template application credentials 113 common to all template applications 115 of a particular service application, where the template applications 115 are downloaded on a plurality of user devices 101 but share common template application credentials 113. The template application 137 information can also include associational information, for example, for each downloaded template application 115, the associational information could include a user device 101 identifier associated with the user device 101 on which the respective template application 115 is downloaded and a user identifier associated with a user which requested download of the template application 115. The IMAS 135 can store application instance specific information 138, for example, application instance specific credentials 119 specific to a particular application instance 117 operating on a specific user device 101. Accordingly, each application instance 117 of a service application is assigned its own application instance specific credentials 119. The application instance specific information 138 can also include associational information, for example, for each registered application instance 117 (transitioned from a respective downloaded template application 115), the associational information could include a user device 101 identifier associated with the user device 101 on which the respective application instance 117 is registered and a user identifier associated with a user which requested registration of the application instance 117. The IMAS 135 can store application information 139, for example, service application credentials of a service application. The service application credentials are common to all downloaded template applications 115 and application instances 117 of the service application on all user devices 101 on which the template applications 115 and application instances 117 operate. The application information 138 can also include associational information, for example, for each service application, the associational information could include, for each registered application instance 117 of the service application, an application instance specific credential 119, a user device 101 identifier associated with the user device 101 on which the respective application instance 117 is registered, and a user identifier and user credentials associated with a user which requested registration of the application instance 117. For each service application, the associational information could include, for each downloaded template application 115 of the service application which has not been registered as an application instance 117, template application credentials 113, a user device 101 identifier associated with the user device 101 on which the respective template application 115 is registered, and a user identifier and user credentials associated with a user which requested download of the template application 115. Further details about user information 136, template application information 137, application instance specific information 138, and application information 139, including various associational information stored by the IMAS 135, is described in further detail with respect to FIG. 2. Also, the IMAS 135 can provide an application store 131 which stores information associated with a plurality of service applications (e.g. including example application I 133 and application II 134 depicted in FIG. 1) for which the IMAS 135 can provide services directed to registration of template applications 115 as application instances 117 (e.g. assigning application instance specific credentials 119) and providing access tokens for access of protected resources of TPAPs 140, as described in further detail in FIG. 3 and FIG. 6 herein. In certain embodiments, the application store 131 can provide a template application 115 for download associated with a respective service application responsive to receiving a request from a user device 101.

In an example, the user device 101 is a smartphone device, a tablet device, a personal computer, or other user computing device on which a user can download the template application 115 (which can become the application instance 117 via registration). The user device 101 comprises, in certain embodiments, the template application 115 (which transitions to be the application instance 117), a browser application 110, and, in some instances, a user interface and a data storage unit. For example, the template application 115 is downloaded onto the user device 101 from a service system. In some embodiments, the service system is associated with the CSP infrastructure 130. For example, a user accesses the service system via the browser application 110 and the network 125 and downloads the template application 115 onto the user device 101 via the network 125 in a download request. In some instances, the downloaded template application 115 is an application instance 117 that operates in a limited functionality mode (called a "template mode") and, while in the limited functionality mode, can perform only limited functions including performing a registration flow to receive, from the IMAS 135, client credentials (e.g. client ID and secret) that are specific to the application instance 117. The user device 101 can store the received client ID and secret. In some instances, the user interface of the user device 101 is able to receive inputs to the user device 101 (e.g. from a user) and provide outputs (e.g. display visual, auditory, or other output) of the user device 101. In some instances, the user interface comprises a touch screen interface. In some embodiments, the user device 101 can receive one or more inputs from the user associated with a registration request 103 of the template application 115. For example, the user device 101 can receive a request to register the template application 115 via the user interface. For example, the user device 101 can receive user credentials via the user interface. Upon completion of the registration request 103, the template application 115 operates as an application instance 117 and no longer operates in the limited functionality mode. For example, the application instance 117 can perform operations associated with usage of the application 104 that the template application 115 (prior to assignment of application instance specific credentials 119 by the IMAS 135 and transition of the template application 115 to an application instance 117) could not perform.

Figure 2:
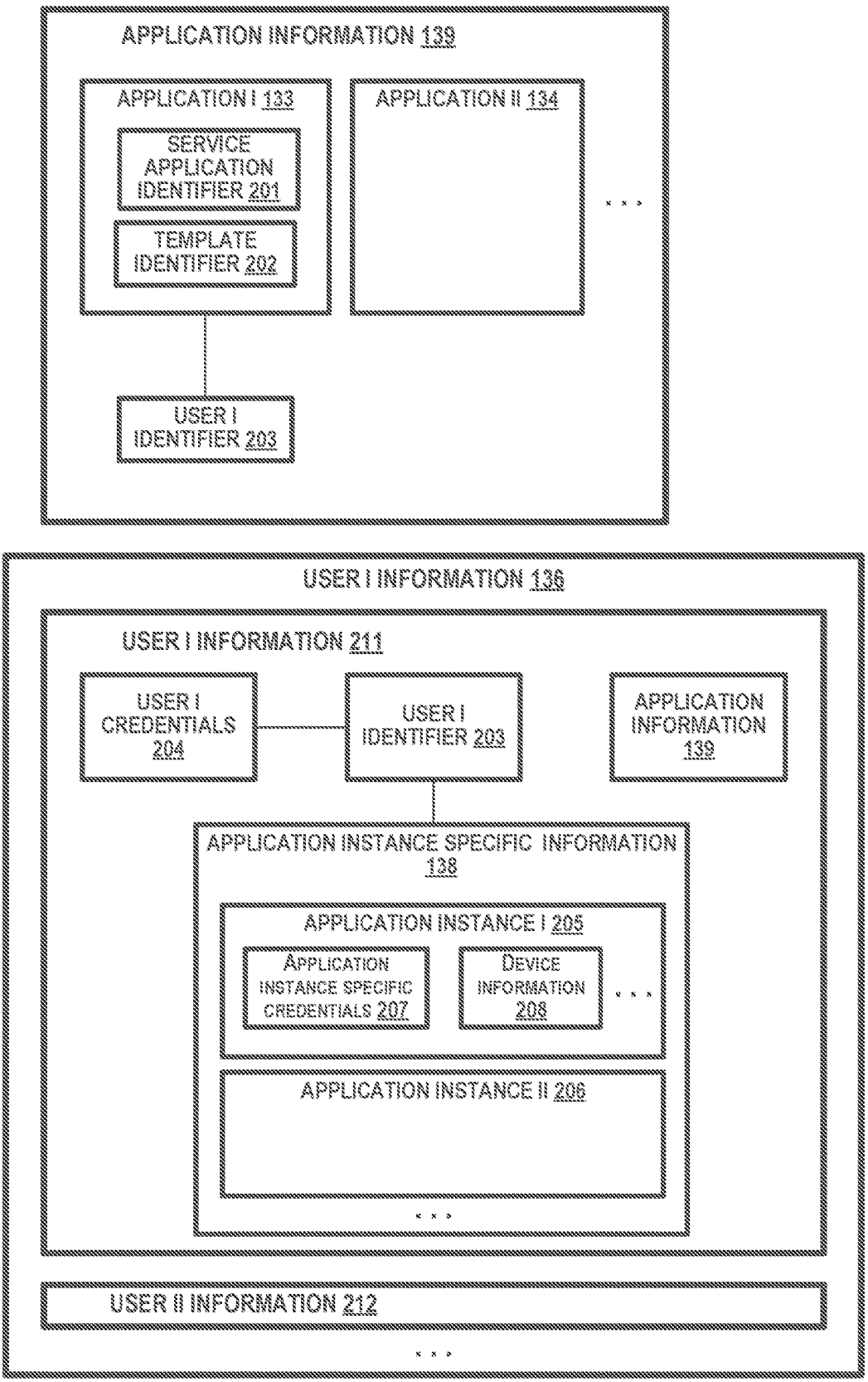
FIG. 2 depicts how the IMAS of FIG. 1 can associate various information, according to certain embodiments.

FIG. 2 depicts an example of how the IMAS of FIG. 1 can associate various information, according to certain embodiments. The user information 136 can be stored by the IMAS 135 for various users, for example, for example, user I information 211 for a first user, user II information 212 for a second user, and additional respective user information 136 for a third, a fourth, a fifth, . . . an n-th user of a set of n users. The user I information 211 includes user I credentials 204, a user I identifier 203, application instance specific information 138, and application information 139. As depicted in FIG. 2, the user I identifier 203 is associated with the user I credentials 204 and with the application instance specific information 138. For example, the application instance specific information 138 of the user I information 211 lists, for the user associated with the user I identifier 203, all application instances 117 (e.g. application instance I 205, application instance II 206, etc.) associated with the user and, for each application instance 117, an application instance-specific credential 119 and user device 101 information identifying the user device 101 on which the application instance 117 is registered. For example, as depicted in FIG. 2, application instance I 205 can be associated with application instance specific credentials 207, device information 208 identifying the user device 101 on which the application instance I 205 is registered, and other information associated with the application instance I 205 (e.g. a time of download of a template application 115, a time of registration of application instance I 205 and transition of the template application 115 to being the application instance I 205). In this example, the IMAS 135 can associate similar types of information with application instance II 206 and other application instances 117 registered by the user associated with the user I identifier 203 as the types of information associated with application I 205. The IMAS 135 can associate similar types of information with a user II identifier 203 in the user II information 212 as is associated with the user I identifier 202 in the user I information 212. For example, the IMAS 135 can associate specific user credentials with a user II identifier and application instance specific information 138 with the user II identifier in a similar manner in which the user I credentials 204 and the application instance specific information 138 of the first user is associated with the user I identifier 203. The IMAS 135 can also associate similar types of information with successive user identifiers of users known to the IMAS 135.

As depicted in FIG. 2, the IMAS 135 can, within application information 139, associate a service application identifier 201 and a template identifier 202 of a service application (e.g. application I 133), with the user identifier (e.g. with a user I identifier 203 as depicted). The service application identifier 201 is shared by all template applications 115 and application instances 117 of service application I 133. The template identifier 202 (e.g. template application 115 credentials) is shared by all template applications 115 of the service application I 133. In some instances, the IMAS 135 can associate information for service application I 133 with a plurality user identifiers associated with a plurality of users who have downloaded a template application 115 for service application I 133 and/or registered an application instance 117 for service application I 133. Likewise, information for service application II 134 (including a service application identifier and template identifier) and information for other service applications known to the IMAS 135 can be associated with user identifiers of users who have downloaded a template application 115 for service application II 134 (or other service application) and/or registered an application instance 117 for service application II 134 (or other service application).

The scheme for organizing and associating various types of data (e.g. service application identifiers, template application 115 identifiers, user identifiers, user credentials, application instance specific credentials 119, user device 101 information) depicted in FIG. 2 is example and other approaches to organizing these types of data may be used. The information associated by the IMAS 135, such as the organized associated information depicted in FIG. 2, can be then used for various different purposes. For example, the information may be used to easily and efficiently deactivate a specific application instance 117 (e.g., an application instance 117 on a particular user device 101), deactivate a particular user and all application instances 117 associated with that particular user, deactivate all application instances 117 of the applications associated with multiple users, and the like. Further details about this selective deactivation are provided in FIG. 7, FIG. 8, FIG. 9, FIG. 10, and FIG. 11.

Figure 3:
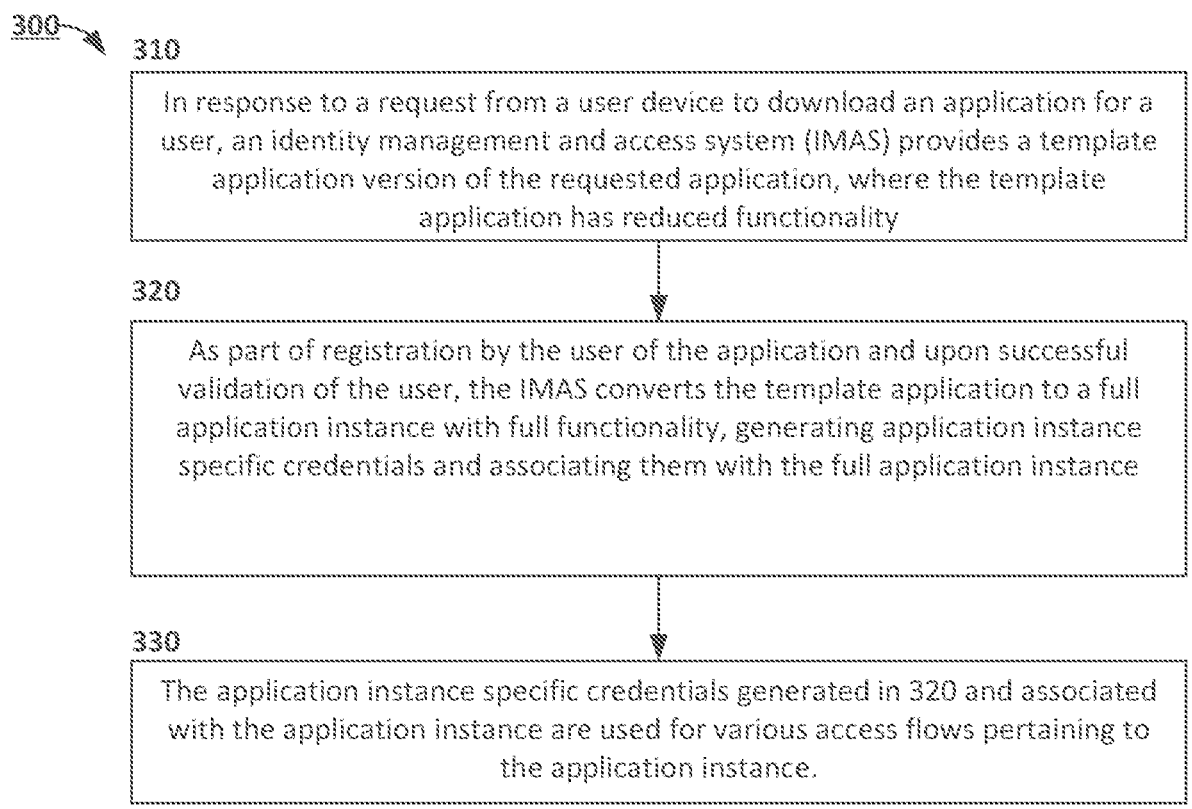
FIG. 3 is a block flow diagram depicting processing performed by an IMAS to provide a template application to a user device with limited functionality and to perform a registration flow with the template application to transition the template application to an application instance having nonlimited functionality and assign application instance-specific credentials to the application instance for use in an access flow, according to certain embodiments.

FIG. 3 is a block flow diagram depicting processing performed by an IMAS to provide a template application to a user device with limited functionality and to perform a registration flow with the template application to transition the template application to an application instance having nonlimited functionality and assign application instance-specific credentials to the application instance for use in an access flow, according to certain embodiments The processing depicted in FIG. 3 may be implemented in software (e.g., code, instructions, program) executed by one or more processing units (e.g., processors, cores) of the respective systems, in hardware, or combinations thereof. The software may be stored on a non-transitory computer-readable storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel.

As shown in FIG. 3, at block 310, in response to a request from a user device 101 to download an application for a user, an identity management and access system (IMAS) 135 provides a template application 115 version of the requested application, where the template application 115 has reduced functionality. For example, a user of the user device 101 accesses a website of the IMAS 135 via the browser application 110, selects an application from a list of applications, and downloads the template application 115 associated with the selected application to the user device 101. In some instances, the IMAS 135 generates user credentials for the user to use for download of the template application 115 and provides these user credentials to the user at the time before download of the template application 115. For example, the IMAS 135 can provide a physical copy of the user credentials to the user or otherwise transmit (e.g. via email, text messaging, messaging application communications, etc.) the user credentials to the user or to the user device 101 of the user. In some instances, the user registers an account with the IMAS 135 and receives a user identifier and user credentials for the user account. The user credentials can include a user name and a password. In some instances, the user provides (e.g. via the browser application 110) a user name and password and the IMAS 135 stores the user name and password provided by the user as the user credentials. Further details about downloading the template application 115, including a process for downloading the template application 115 onto the user device 101, are described in FIG. 4.

At block 320, as part of registration by the user of the application and upon successful validation of the user, the IMAS 135 converts the template application 115 to a full application instance 117 with full functionality, generating application instance-specific credentials 119 and associating them with the full application instance 117. The downloaded template application 115 has to be registered before it can be used with its full functionality as an application instance 117. The user can perform this registration via the browser application 110 executing on the user device 101. The template application 115 can communicate with the IMAS 135 and includes a service name identifier and a template identifier that is the same for all downloaded template applications 115 associated with the application associated with the service name identifier. The template application instance is configured to perform a limited set of functions, which is a small subset of the overall functions that the application can perform in normal mode when the template application 115 is converted to an application instance 117. The limited set of functions include the registration process with the IMAS 135 that, if successful, results in the template application 115 transitioning to an application instance 117 and receiving application instance-specific credentials 119 generated by the IMAS 135. Upon receipt of the client credentials, the application instance 117 transitions from the template mode (in which it was a template application 115) to a full functionality mode in which it can perform a full set of functions. For example, the template mode only allowed a limited subset of functions to be performed by the template application 115 including performing the registration flow. In the full functionality mode, the application instance 117 can perform regular business functionality in the full functionality mode after it has the application instance-specific credentials 119 (e.g. client ID and secret). Further details about performing the registration process initiated using the template application 115 is described in FIG. 5 and FIG. 6.

At block 330, the application instance-specific credentials 119 generated in block 320 and associated with the application instance 117 are used for various access flows pertaining to the application instance 117. For example, after receiving application instance-specific credentials 119 from the IMAS 135, the application instance 117 can use the application instance-specific credentials 119 to access a protected resource from a third party access provider (TPAP) 140. In some instances, the application instance 117 can use the application instance-specific credentials 119 to obtain an access token from the IMAS 135 and then use the access token to access the protected resource. The protected resource could include data file (e.g. a video, a sound file, a database, etc.), a service (e.g. a predictive model), a data storage unit, or other protected resource. Further details about using the application instance-specific credentials for an access flow are described in FIG. 6.

Figure 4:
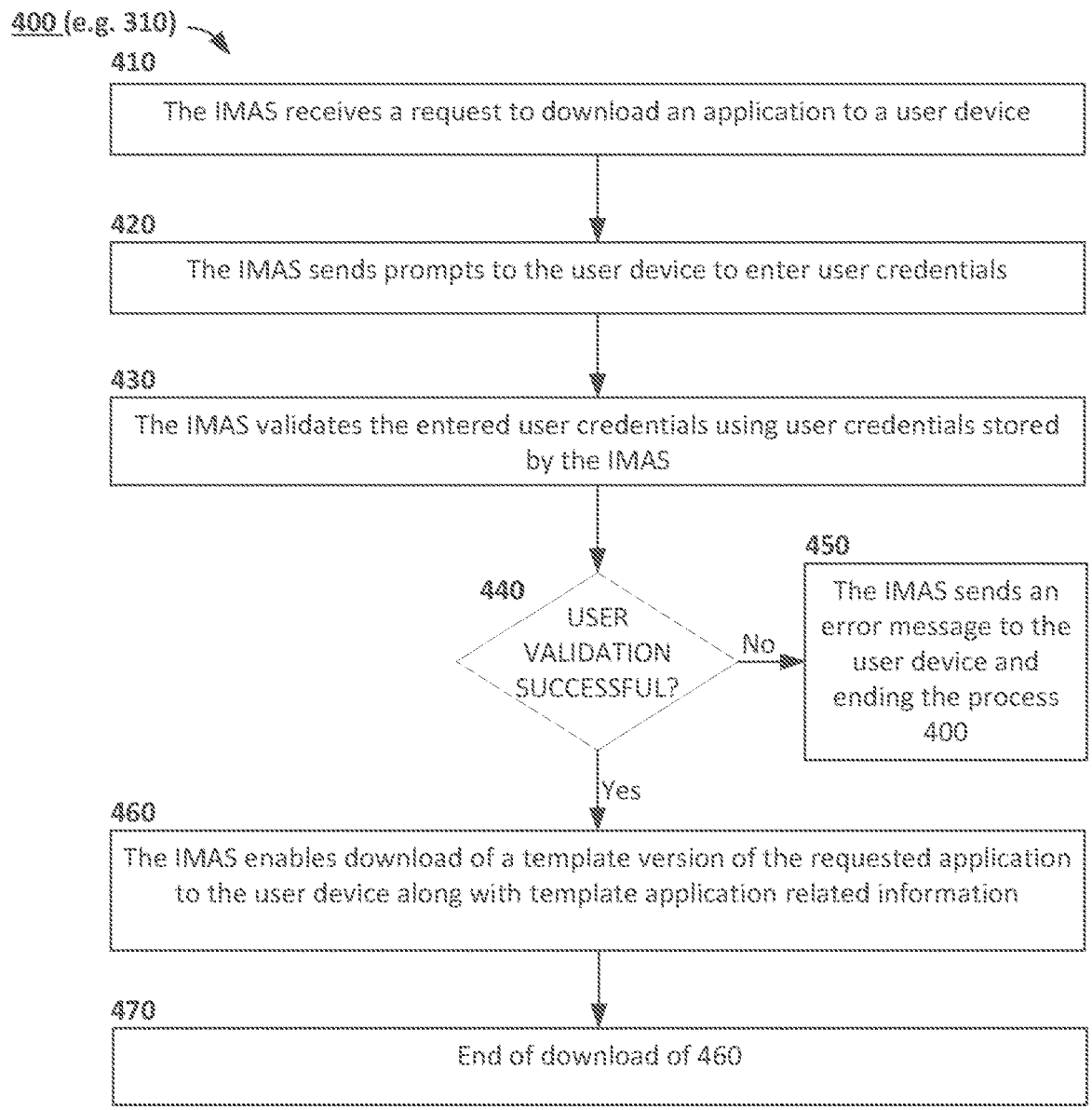
FIG. 4 is a block flow diagram depicting processing performed an IMAS to provide a template application having limited functionality to a user device, according to certain embodiments.

FIG. 4 is a block flow diagram depicting processing performed an IMAS to provide a template application having limited functionality to a user device, according to certain embodiments. The processing depicted in FIG. 4 may be implemented in software (e.g., code, instructions, program) executed by one or more processing units (e.g., processors, cores) of the respective systems, in hardware, or combinations thereof. The software may be stored on a non-transitory computer-readable storage medium (e.g., on a memory device). The method 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. As depicted in FIG. 4, the method 400 of FIG. 4 can be used to implement block 310 of method 300.

As shown in FIG. 4, at block 410, the IMAS 135 receives a request to download an application to a user device 101. For example, a user of the user device 101 accesses a website of the IMAS 135 via the browser application 110, selects an application from a list of applications and requests to download the application. The IMAS 135 receives, via the network 125 from the browser application 110, the selection of the application and the request to download the application.

At block 420, the IMAS 135 sends prompts to the user device 101 to enter user credentials. For example, the IMAS 135 transmits a request to the user device 101 for the user to enter user credentials. User credentials could include a user name and a password associated with the user. In some embodiments, the browser application 110 displays a request to enter user credentials responsive to the user device 101 receiving the prompts to enter user credentials. The request displayed via the browser application 110 could include one or more input fields for receiving the user credentials. For example, the browser application 110 displays an input field to receive a user name and an input field to receive a password and the user enters the user name and password in their respective input fields via the user interface of the user device 101. The browser application 110 transmits the received user credentials to the IMAS 135 via the network 125.

In certain examples, the user credentials are created when the user registers an account with the IMAS 135 before requesting to download the application and the IMAS 135 generates a user identifier and provides the user credentials to the user at the time that the user registers an account. The IMAS 135 associates the user identifier with the user credentials. For example, the IMAS 135 may generate the user credentials and transmit the user credentials to the user device 101 via text message, other messaging communication, email, or other communication method. In some instances, the user generates user credentials when the user account is registered and transmits the user credentials to the IMAS 135 and, if the user credentials are unique and satisfy one or more criteria (length, number of special characters, etc.), the IMAS 135 stores the user credentials and associates the user credentials with the user identifier.

At block 430, the IMAS 135 validates the entered user credentials using user credentials stored by the IMAS 135. For example, the IMAS 135 can identify a user identifier associated with the request for download of the application and retrieve, from a data storage unit accessible to the IMAS 135, stored user credentials associated with the user identifier. For example, as depicted in FIG. 2, the IMAS can store a user identifier (e.g. user I identifier 203) associated with user credentials (e.g. user I credentials 204) and can retrieve user credentials corresponding to a particular user identifier.

At block 440, the IMAS 135 determines whether the user validation of block 430 is successful. The IMAS 135 compares the stored user credentials with the user credentials entered by the user via the user device 101 to determine if the stored user credentials match the entered user credentials.

If the user validation of block 430 is not successful, the method 400 proceeds to block 450 and, at block 450, the IMAS 135 sends an error message to the user device 101, ending the process of method 400. For example, The IMAS 135 determines that the stored user credentials do not match the entered user credentials. For example, the entered user name and/or password does not match the corresponding stored user name and/or password. The error message could include a message stating that the user credentials are incorrect and/or the user is not able to download the application. In some embodiments, the IMAS 135 provides multiple opportunities for the user to enter correct user credentials that match the stored user credentials. For example, the IMAS 135 may provide the user with a predetermined number of attempts (e.g. two, three, or other number of predetermined number of attempts) to enter correct user credentials. If the user enters incorrect credentials and the IMAS 135 determines that the user has attempted entering user credentials less than the predetermined number of times, in this example, the IMAS 135 repeats blocks 420 and 430. However, if the user enters incorrect credentials and the user has attempted to enter user credentials the predetermined number of times, the IMAS sends the error message to the user device 101 and the process 400 ends. Ending the process 400 can include preventing the user device 101 from communicating with the IMAS 135.

Returning to block 440, if the user validation of block 430 is successful, the method 400 proceeds to block 460. The IMAS 135 determines that the stored user credentials match the entered user credentials. For example, the IMAS 135 determines that the stored user name matches the entered user name and the stored password matches the entered password.

At block 460, the IMAS 135 enables download of a template version of the requested application to the user device 101 along with template application 115 related information. For example, the user device 101 downloads, via the network 125 from the IMAS 135, the template application 115. The IMAS 135 provides the template application 115 with a service identifier associated with the application that the user selected for download and a template application credentials 113 (e.g. a template identifier) associated with the template application 115.

At block 470, the download of block 460 ends. Upon successful download of the template application 115 by the user device 101, the IMAS 135 can store the service identifier and the template application credentials 113 (e.g. template identifier) in association with the user identifier, as depicted in FIG. 2. The IMAS 135 can also associate the template application credentials 113 and/or user identifier with a user device 101 identifier associated with the user device 101 on which the template application 115 was downloaded. The template application credentials 113 is associated with all downloaded template applications 115 whereas the service identifier is associated with all downloaded template applications 115 and application instances 117 provided by the IMAS 135. The template application 115 is configured to perform a limited set of functions, which is a small subset of the overall functions that the application can perform in normal mode if the template application 115 is converted to an application instance 117 as described in FIG. 5. The limited set of functions include the registration process with the IMAS 135 described in FIG. 5 that, if successful, results in the template application 115 transitioning to an application instance 117 and receiving application instance-specific credentials 119 generated by the IMAS 135.

Figure 5:
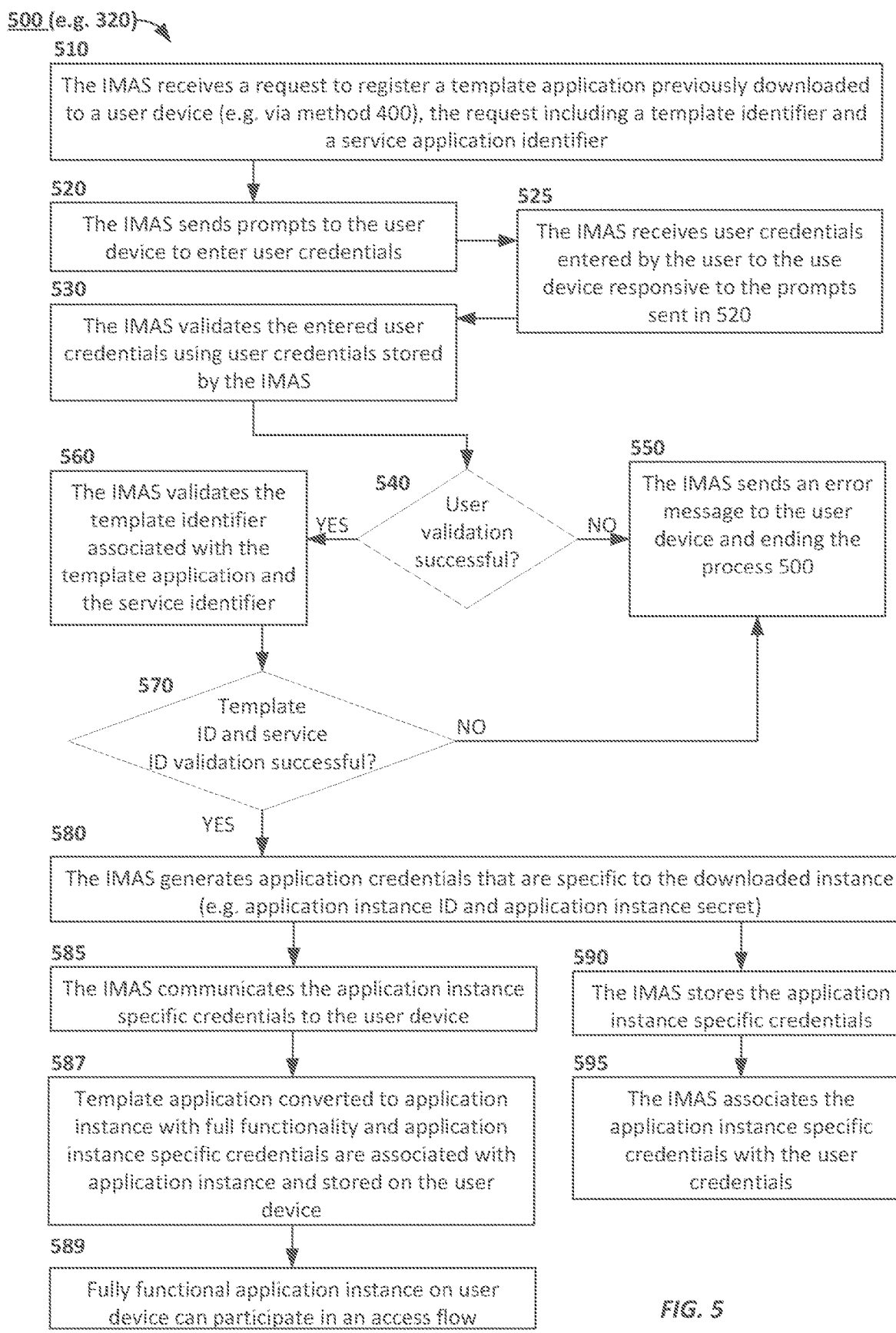
FIG. 5 is a block flow diagram depicting processing performed by an IMAS to perform a registration flow with the template application to transition the template application to an application instance having nonlimited functionality and assign application instance-specific credentials to the application instance for use in an access flow.

FIG. 5 is a block flow diagram depicting processing performed by an IMAS to perform a registration flow with the template application to transition the template application to an application instance having nonlimited functionality and assign application instance-specific credentials to the application instance for use in an access flow. The processing depicted in FIG. 5 may be implemented in software (e.g., code, instructions, program) executed by one or more processing units (e.g., processors, cores) of the respective systems, in hardware, or combinations thereof. The software may be stored on a non-transitory computer-readable storage medium (e.g., on a memory device). The method 500 presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. As depicted in FIG. 5, the method 500 of FIG. 5 can be used to implement block 320 of method 300.

As shown in FIG. 5, at block 510, the IMAS 135 receives a request to register a template application 115 previously downloaded to a user device (via method 400), the request including a template identifier and a service application identifier. The downloaded template application 115 has to be registered before it can be used with its full functionality as an application instance 117. The user can perform this registration via the browser application 110 executing on the user device 101. The template application 115 can communicate with the IMAS 135 and can access, from the user device 101, a service name identifier and a template identifier that is the same for all downloaded template applications 115 of the application associated with the service identifier. The template application 115 can transmit the service identifier and the template identifier to the IMAS 135 in the request to register the template application 115.

At block 520, the IMAS 135 sends prompts to the user device 101 to enter user credentials. For example, the IMAS 135 transmits a request to the user device 101 for the user to enter user credentials. User credentials could include a user name and a password associated with the user. In some embodiments, the browser application 110 displays a request to enter user credentials responsive to the user device 101 receiving the prompts to enter user credentials. The request displayed via the browser application 110 could include one or more input fields for receiving the user credentials. For example, the browser application 110 displays an input field to receive a user name and an input field to receive a password and the user enters the user name and password in their respective input fields via the user interface of the user device 101. The browser application 110 transmits the received user credentials to the IMAS 135 via the network 125.

At block 525, the IMAS 135 receives user credentials entered by the user to the user device 101 responsive to the prompts sent in block 520. For example, the browser application 110 displays an input field to receive a user name and an input field to receive a password and the user enters the user name and password in their respective input fields via the user interface of the user device 101. The browser application 110 transmits the received user credentials to the IMAS 135 via the network 125.

At block 530, the IMAS 135 validates the entered user credentials using user credentials stored by the IMAS 135. For example, the IMAS 135 can identify a user identifier associated with the request for registration of the template application 115 and retrieve, from a data storage unit accessible to the IMAS 135, stored user credentials associated with the user identifier.

At block 540, the IMAS 135 determines whether the user validation of block 530 is successful. The IMAS 135 compares the stored user credentials with the user credentials entered by the user via the user device 101 to determine if the stored user credentials match the entered user credentials.

If the user validation of block 530 is not successful, the method 500 proceeds to block 550 and, at block 550, the IMAS 135 sends an error message to the user device 101 and ends the process of method 500. For example, The IMAS 135 determines that the stored user credentials do not match the entered user credentials. For example, the entered user name and/or password does not match the corresponding stored user name and/or password. The error message could include a message stating that the user credentials are incorrect and/or the user is not able to download the application. In some embodiments, the IMAS 135 provides multiple opportunities for the user to enter correct user credentials that match the stored user credentials. For example, the IMAS 135 may provide the user with a predetermined number of attempts (e.g. two, three, or other number of predetermined number of attempts) to enter correct user credentials. If the user enters incorrect credentials and the IMAS 135 determines that the user has attempted entering user credentials less than the predetermined number of times, in this example, the IMAS 135 repeats blocks 520, 525, and 530. However, if the user enters incorrect credentials and the user has attempted to enter user credentials the predetermined number of times, the IMAS sends the error message to the user device 101 and the process 500 ends. Ending the process 500 can include preventing the user device 101 from communicating with the IMAS 135.

Returning to block 540, if the user validation of block 530 is successful, the method 500 proceeds to block 560. The IMAS 135 determines that the stored user credentials match the entered user credentials. For example, the IMAS 135 determines that the stored user name matches the entered user name and the stored password matches the entered password.

At block 560, the IMAS 135 validates the template identifier associated with the template application 115 and the service identifier. For example, the IMAS 135 can identify a user identifier associated with the request for registration of the template application 115 and retrieve, from a data storage unit accessible to the IMAS 135, stored service application identifier and a stored template identifier for an application associated with the user identifier. For example, as depicted in FIG. 2, the IMAS 135 can associate, with a user I identifier 203 of a user who downloaded the template application 115 of an application I 133, a service identifier 201 identifying the application I 133 and a template identifier 202 (e.g. template application credentials 113) identifying the downloaded template application 115. Accordingly, based on the user identifier and the received service identifier identifying the application, the IMAS 135 can retrieve a stored template identifier associated with the template application 115.

At block 570, the IMAS 135 determines whether the template identifier and service identifier validation of block 560 is successful. The IMAS 135 compares the stored service identifier and the stored template identifier with the corresponding service identifier and template identifier received in block 510 to determine if the received service identifier matches the stored service identifier and if the received template identifier matches the stored template identifier.

If the template identifier validation or service identifier validation of block 560 is not successful, the method 500 returns to block 550 and, at block 550, the IMAS 135 sends an error message to the user device 101 and ends the process of method 500. For example, the IMAS 135 determines that the stored service identifier does not match the received service identifier. In another example, the IMAS 135 determines that the stored template identifier does not match the received template identifier. The error message could include a message stating that the template identifier and/or the service identifier was not validated and/or the user is not able to register the template application 115. Ending the process 500 can include preventing the user device 101 from communicating with the IMAS 135.

Returning to block 570, if the template identifier and service identifier validation of block 560 is successful, the method 500 proceeds to block 580. For example, the IMAS 135 determines that the stored service identifier matches the received service identifier and that the stored template identifier matches the received template identifier.

At block 580, the IMAS 135 generates application credentials that are specific to the downloaded instance (e.g. an application instance ID and an application instance secret). In some instances, the IMAS 135 generates the application instance-specific credentials 119 using one or more random number generators of the IMAS 135 or accessible to the IMAS 135. The IMAS 135 generates application instance-specific credentials 119 that are specific to the application instance 117 (previously the template application 115) being registered. These application instance-specific credentials 119 are unique and are not the same as any other identifiers and/or credentials associated with other application instances 117 and template applications 115 on the user device 101 or on other user devices 101. Accordingly, different application instance-specific credentials 119 generated by the IMAS 135 for different application instances 117 downloaded (as template applications 115) by the same user on different user devices 101 or different application instances 117 downloaded (as template applications 115) by different users on one or more user devices 101. Accordingly, where multiple application instances 117 of the application are downloaded (as template applications 115) onto multiple user devices 101, each application instance 117 of the application, during a respective registration flow, is assigned unique application instance-specific credentials 119 (e.g. a unique client ID and secret) generated by the IMAS 135. Accordingly, the IMAS 135 generates application instance-specific credentials 119 that are specific to a registered application instance 117.

After performing the processing of block 580, the method 500 involves performing blocks 585. 587, and 589 and performing blocks 590 and 595. As depicted in FIG. 5, the steps 585, 587, and 589 may be performed in parallel to the steps of blocks 590 and 595. In some instances, the steps 585, 587, and 589 are performed prior to the steps of blocks 590 and 595. In some instances, the steps 585, 587, and 589 are performed after completion of the steps of blocks 590 and 595.

At block 585, the IMAS 135 communicates the application instance specific credentials 119 to the user device 101. For example, the IMAS 135 transmits the application instance-specific credentials 119 generated in block 580 to the template application 115 (which becomes the application instance 117) via the network 125.

At block 587, the template application 115 is converted to an application instance 117 with full functionality and the application instance-specific credentials 119 are associated with the application instance 117 and are stored on the user device 101. Upon receipt of the client credentials, the template application 115 transitions from the template mode to being an application instance 117 operating in a full functionality mode in which it can perform a full set of functions. In certain embodiments, the template application 115 is configured to restrict/lock certain operations and to automatically un-restrict/unlock these operations responsive to receiving the application instance-specific credentials 119. For example, the template mode only allowed a limited subset of functions included performing the registration flow.

Figure 6:
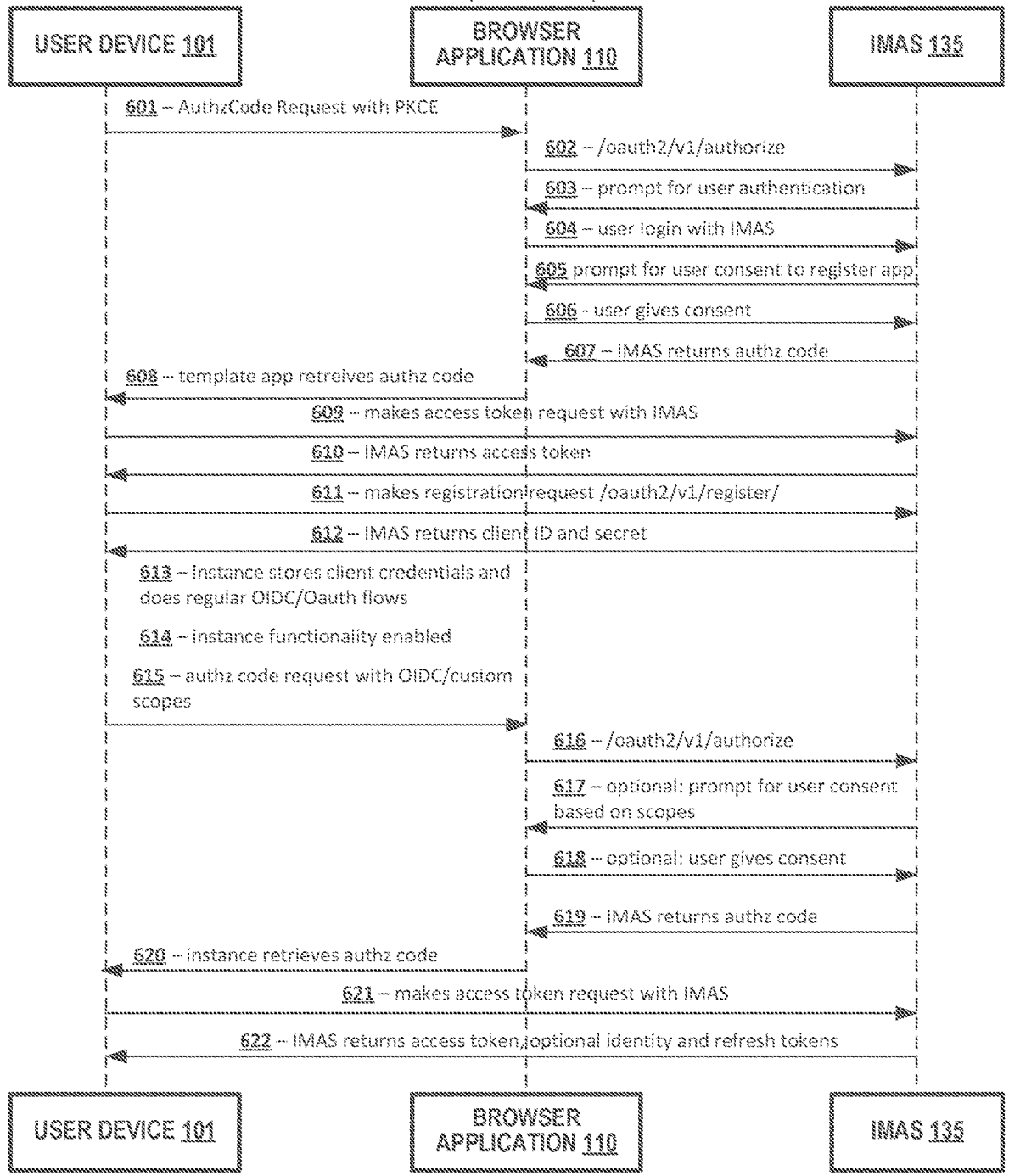
FIG. 6 is a flow diagram depicting processing for assigning application instance-specific credentials to an application instance in a registration flow and for providing access to a protected resource in an access flow, according to certain embodiments.

At block 589, the fully functional application instance 117 on the user device 101 can participate in an access flow. In the full functionality mode, the application instance 117 can perform regular business functionality in the full functionality mode after it has the client ID and the secret. For example, the registered application instance 117 can now use the application instance-specific credentials 119 received from the IMAS 135 for accessing resources and participating in access flows. An example of an access flow is depicted in FIG. 6.

At block 590, the IMAS 135 stores the application instance-specific credentials 119. The IMAS 135 can store these application instance-specific credentials 119 in an associational database of the IMAS 135 or an associational database that is otherwise accessible to the IMAS 135. The IMAS 135 can store the application instance-specific credentials 119 in a same associational database as the IMAS 135 stores user identifiers, user credentials, service identifiers, template identifiers, and user device identifiers.

At block 595, the IMAS 135 associates the application instance-specific credentials 119 with the user credentials. The IMAS 135 can associate the application instance-specific credentials 119 with the user identifier and also associate the user identifier with the user credentials, as depicted in FIG. 2. Further details on how the IMAS 135 can associate application instance specific information 138 (including application instance specific credentials) with a user identifier are described in FIG. 2.

In one embodiment, the template application 115 may be configured as follows:
ClientId: <ServiceName>-RegisterTemplateAppId(-RegisterTemplateAppID part is a fixed value)
Allowed Grants: Authorization Code, Refresh Token
Allowed Scopes: <defining the accessible services scopes>. IMAS spec scopes may be implicitly allowed for login to work out of the box.
Redirect Uris: Allowed redirects uris. Typically contain mobile app specific syntax (i.e. mobileapp://)
Logout Uri: optional.
Post Logout Uri: optional
Allowed Operations: Introspect. This is to call /oauth2/v1/introspect.
IMAS AppRoles: optional FIG. 6 depicts processing for assigning application instance-specific credentials 119 to an application instance 117 in a registration flow and for providing access to a protected resource in an access flow, according to certain embodiments. The processing depicted in FIG. 6 may be implemented in software (e.g., code, instructions, program) executed by one or more processing units (e.g., processors, cores) of the respective systems, in hardware, or combinations thereof. The software may be stored on a non-transitory computer-readable storage medium (e.g., on a memory device). The method 600 presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. As depicted in FIG. 6, the process 600 of FIG. 6 can be used to implement blocks 320 and 330 of method 300. For example, steps 601-614, which describe an example registration flow, can be used to implement block 320 of method 300 of FIG. 3 and steps 615-622, which describe an example access flow, can be used to implement block 330 of method 300 of FIG. 3.

The processing depicted in FIG. 6 assumes that the template application 115 (which will become the application instance 117) has been downloaded on the user device 101. The template application 115 has no associated client credentials (e.g. client ID and secret) when downloaded onto the user device 101. The downloaded template application 115 has to be registered before it can be used as an application instance 117. The user can perform this registration via the browser application 110 executing on the user device 101. In some instances, when the user of the user device 101 purchases the application, the IMAS 135 generates user credentials 204 for the user to use during registration of the template application 115 as an application instance 117. The downloaded template application 115, prior to conducting the registration flow (e.g. steps 601 through 614) depicted in FIG. 6, operates in a template mode and is only able to perform specific functions. Specific functions may include communicating with the IMAS 135 and conducting the registration flow depicted in FIG. 6 in steps 601 through 614. In some instances, the IMAS 135, prior to or during the user device 101 downloading the template application 115, associates the template application 115 with a service application identifier 201 and a template identifier 202. The template identifier 202 is common to all downloaded template applications 115 associated with an application (e.g. application 133) and the service application identifier 201 is common to all downloaded template applications 115 and application instances 117 associated with the application (e.g. application 133). For example, downloaded application instances 117 that have not yet been registered in accordance with the registration flow depicted in FIG. 6 operate in the template mode (e.g. operate as template applications 115). In one embodiment, the template application 115 may be configured as follows:
ClientId: <ServiceName>-RegisterTemplateAppId(-RegisterTemplateAppID part is a fixed value)
Allowed Grants: Authorization Code, Refresh Token
Allowed Scopes: <defining the accessible services scopes>. IMAS spec scopes may be implicitly allowed for login to work out of the box.
Redirect Uris: Allowed redirects uris. Typically contain mobile app specific syntax (i.e. mobileapp://)
Logout Uri: optional.
Post Logout Uri: optional
Allowed Operations: Introspect. This is to call /oauth2/v1/introspect.
IMAS AppRoles: optional Upon completion of the registration flow that is depicted in FIG. 6 steps 601 through 614 and as described in further detail below, the application instance 117 is able to access resources via cloud services provider (CSP) infrastructure 130 in steps 615 through 622.

The various entities depicted in FIG. 6 that perform the processing of the registration flow in steps 601 through 614 include the user device 101, the browser application 110 executing on the user device 101, and the IMAS 135. Other auth/authorization system may also perform processing of the IMAS 135.

At step 601, the template application 115 transmits a login request including an authorization code request ("Authz code request") to the browser application 110 executing on the user device 101. In some embodiments, the Authz code request uses a Proof Key for Code Exchange (PCKE) or other login standard. In some embodiments, the Authz code request includes a uniform resource identifier ("URI") that directs the browser application 110 to an endpoint corresponding to the URI, where the endpoint is a server of the IMAS 135 where the processing is to be performed.

At step 602, the browser application 110 communicates an authorization request ("OAuth request") to the IMAS 135, for example, identified by the URI. In some embodiments, the OAuth request includes the service name ID 201, the template ID 202, and other parameters associated with the template application 115. The IMAS 135, in some embodiments, validates the information received in the OAuth request including the service name ID 201, the template ID 202, and other parameters associated with the template application 115. Validation can include comparing the received template ID 202 and service name ID 201 to a template ID 202 and service named ID 201 associated with the template application 115 stored in a data storage unit accessible to the IMAS, to determine a match. In certain embodiments, the OAuth request includes A URI endpoint for performing the login processing, such as https://idcs-url/oauth2/v1/authorize?client_id=<ServiceName>-RegisterTemplateAppId&scope=urn:opc:idm:app:register$redirect)uri=>redirect)uri-value>&code_challenge=code_challenge & code_challenge_method=S256&state=<state-value>&nonce=<nonce-value>. As can be seen from the this URL, the request include various parameters such as: (a) client_id param value—this is validated by IMAS 135 based on template application instance's defined value; (b) redirect_uri param value—this is validated by IMAS 135 based on template application's defined value; (c) scope param value—this is validated by IMAS 135. It is a reserved/well-known scope on IMAS 135 side, and (d) code_challenge param—this is preserved during token request verification. In some instances, the service identifier and template identifier are also provided as parameters. The IMAS 135 may have access to a list of valid service ID and template ID mappings and use them to validate the OAuth request. The service ID may identify the service for which the registration of the template application 115 is being provided. The template ID identifies the template application 115, and is common to all template applications 115 associated with the service ID.

At step 603, in some embodiments, responsive to validation of the information in the OAuth request, the IMAS 135 transmits a login information request to the browser application 110 requesting user credentials (e.g. user credentials 204) associated with the user of the user device 101. In some instances, the browser application 110 displays the login information request and requests an input via the user device 101 of the user credentials 204 and authorization for registering the template application 115 as an application instance 117. The browser application 110 receives the user credentials 204 and an authorization to register the template application 115. For example, the user enters the user credentials 204, which may include a user name and a password, to the user device 101 via a user interface of the user device 101 and indicate, via the user interface, an authorization to register the template application 115. Indicating the authorization can include selection of one or more objects displayed on the user interface. The browser application 110 receives the user credentials 204 and the authorization.

At step 604, the browser application 110 transmits, to the IMAS 135, login information including the user credentials 204. In some instances, the login information includes further information such as multifactor authentication information, location information of the user device 101, a current timestamp, or other login information received via user input to the browser application 110 or otherwise provided by the user device 101.

In certain embodiments, however, the IMAS 135 does not transmit a login information request to the browser application 110 and receive login information from the browser application 110.

At step 605, the IMAS 135 transmits a request to the browser application 110 requesting an authorization of the user for registering the template application 115 as an application instance 117. Responsive to receiving the request from the IMAS 135 in step 605, the browser application 110 displays a request to the user to authorize registering the template application 115 as an application instance 117.

At step 606, the browser application 110 transmits, to the IMAS 135, an authorization of the user to register the template application 115. For example, the browser application 110 receives the authorization to register the template application 115. For example, the user indicates, via the user interface of the user device 101, an authorization to register the template application 115. Indicating the authorization can include selection of one or more objects displayed on the user interface.

In certain embodiments, however, the IMAS 135 does not transmit a request to the browser application 110 to request authorization for registering the template application 115.

At step 607, the IMAS 135, upon validation of the template ID 202 and service name ID 201 received in the OAuth request, generates an authorization code ("authz code") and transmits the authz code to the browser application 110. In other embodiments, the IMAS 315, upon validation of the template ID 202 and service name ID 201 received in the OAuth request and validation of the login information received from the browser application 110, generates an authorization code ("authz code") and transmits the authz code to the browser application 110. The IMAS 135 also stores the authz code and associates the authz code with the template application 115 (e.g. in the data storage unit of the IMAS 135). In some instances, the authz code is a temporary authz code that is valid for a predefined length of time.

At step 608, the browser application 110 transmits the authz code received from the IMAS 135 to the template application 115. For example, the template application 115 retrieves the authz code from the browser application 110 and stores the authz code on the user device 101.

At step 609, the template application 115 transmits an access token request including the authz code to the IMAS 135. The IMAS 135 validates the authz code received in the access token request. In certain embodiments, the access token request may have the following format: grant_type=authorization_code&code=<code-value>&client_id=<ServiceName>-RegisterTemplateAppId.

At step 610, upon successful validation of the authz code, the IMAS 135 generates an access token. Successful validation includes comparing the received authorization code to the stored (e.g. in the data storage unit) authorization code to determine a match. The access token, in some embodiments, has a one time usage, is valid for a predefined length of time, and is scoped to perform a particular functionality of registration of the template application 115 as an application instance 117. The IMAS 135, in some instances, stores the access token in a data storage unit and transmits the access token to the template application 115, which also stores the access token in a data storage unit accessible to the user device 101. The IMAS 135 associates the access token with the template application 115.

At step 611, the template application 115 transmits a registration request including the access token to the IMAS 135 requesting registration of the template application 115 as an application instance 117. In certain implementations, the registration request 1 may be in the form: POST: /oauth2/v1/register Authorization: Bearer <access token> Payload: client_id=<ServiceName>-MobileApp At step 612, upon validation of the access token received in the registration request, the IMAS 135 generates application instance-specific credentials 119 which are specific to the application instance 117. For example, the template application 115 is the application instance 117 which is limited to a specific set of functions and, after registration, the template application 115 transitions to being the application instance 117 with its functionality no longer limited. Validation of the access token comprises determining a match between the received access token and the stored access token that is associated with the template application 115. The application instance-specific credentials 119 include a client identifier ("client ID") and secret. The IMAS 135 associates the client ID and secret with the application instance 117 and transmits the client ID and the secret to the template application 115, which, as described below, now acts as the application instance 117.

The application instance specific credentials 119 (e.g. the client ID and the secret) are unique to the application instance 117 being registered. Accordingly, different credentials will be generated by the IMAS 135 for different application instances 117 downloaded (e.g. as template applications 115) and registered by the same user on different user devices 101 or different application instances 117 downloaded by different users on one or more user devices 101. Accordingly, where multiple application instances 117 of the application are downloaded onto multiple user devices 101, each downloaded application instance 117 of the client application, during a respective registration flow, receives unique application instance-specific credentials 119 (e.g. a unique client ID and secret) generated by the IMAS 135. Accordingly, the IMAS 135, during the registration flow depicted in steps 601 through 614, generates application instance-specific credentials 119 that are specific to an application instance 117 on a user device 101. In certain embodiments, the IMAS 135 stores association information including associations between the generated application instance-specific credentials 119 (e.g. the client ID and the secret), the requesting user, the user device 101 on which the application instance 117 being registered is installed, and the service name ID 201. The IMAS 135 stores the application instance-specific credentials 119 and the associations in a data storage unit accessible to the IMAS 135. The IMAS 135 stores an association between the user, the application instance-specific credentials 119, and an identifier associated with the user device 101 on which the application instance 117 operates. In certain implementations, the IMAS maintains the following associations: {user, clientid, <Service identifier>-RegisterTemplateAppId}.

---

{
  "client_id":"<value>",
  "client_secret":"<value>"
}

---

At step 613, the template application 115 stores the application instance-specific credentials 119. For example, the template application 115 stores the application instance specific credentials 119 in a data storage unit of the user device 101.

At step 614, upon receipt of the application instance specific credentials 119 from the IMAS 135, the template application 115 transitions to being the application instance 117 and can perform a full set of functions. For example, the template application 115 no longer operates in template mode or other restricted functionality mode in which its functionality was limited to a limited subset of the full set of functions. For example, the limited subset of functions included performing the registration flow depicted in steps 601 through 614.

Responsive to completing the registration flow depicted in FIG. 6 at steps 601 through 614 including receiving the application instance-specific credentials 119 and storing the application instance-specific credentials 119, the application instance 117 no longer operates as the template application 115 in the limited functionality mode (also called template mode) and now operates in a full functionality mode. For example, the application instance 117 can perform regular business functionality in the full functionality mode after it has the application instance-specific credentials 119 (e.g. client ID and the secret) generated by the IMAS 135. In some embodiments, the regular business functionality includes the processes depicted in steps 615 through 622 of FIG. 6. For example, the registered application instance 117 can now use the application instance-specific credentials 119 received from the IMAS 135 for accessing resources and participating in an access flow for accessing a protected resource of CSP infrastructure 130.

At step 615, the application instance 117 generates an authorization code request ("authz code request") and transmits the authz code request to the browser application 110. In some instances, the application instance 117 retrieves, from a data storage unit accessible to the user device 101, the stored application instance-specific credentials 119 and includes the application instance-specific credentials 119 in the authz code request. In certain embodiments, the OAuth request includes custom scopes information. Custom scopes information includes one or more scope values identifying additional access requested by the application instance 117. For example, the scope values indicate requests for access to specific information of the user of the application instance 117. In certain implementations, the Oauth request may be in the following form:

https://idcs-url/oauth2/v1/authorize?client_id=<value>&scope=openid%20<custom-scope-value>&redirect_uri=<redirect_uri>&state=<state-value>&nonce=<nonce-value> client_id param value is validated by the IMAS 135. redirect_uri param value is validated by the IMAS 135 based on template's defined value. scope param value is validated based on template's defined value. Standard OIDC scopes are implicitly supported.

At step 616, the browser application 110 transmits an authorization request ("oauth request") to the IMAS 135. The oauth request includes the application instance-specific credentials 119. The application instance-specific credentials 119, as described previously in the registration flow depicted in steps 601 through 614, include the client ID and the secret generated by the IMAS 135 for the application instance 117. The oauth request may use an Open ID Connect (OIDC) protocol or other protocol. In certain embodiments, the application instance 117 directs the browser application 110 of the user device 101 to a server of the IMAS 135 to begin an open authorization (OAuth) process and the application instance 117 communicates the application instance-specific credentials 119 to the browser application 110.

In certain embodiments, the IMAS 135 validates the received application instance-specific credentials 119 (e.g. client ID and secret). Validation can include comparing the received client ID and secret to the client ID and secret associated with the application instance stored by the IMAS 135 to determine a match.

At step 617, in some instances, responsive to validation of the information in the oauth request (e.g. validation of the received client ID and secret), the IMAS 135 transmits a prompt to the browser application 110 requesting user consent based on the custom scopes information of the oauth request. The prompt may be transmitted depending on a nature of the business function to be performed by the application instance 117. In certain examples, the prompt includes a request for permission to provide access to information identified by the custom scopes information of the oauth request. The browser application 110 receives the prompt for user consent. In some instances, the browser application 110 displays, via the user interface, a description of the custom scopes information and the prompt and requests an input via the user device 101 of an indication of user consent based on the custom scopes information of the oauth request. In some instances, the browser application 110 receives an indication of user consent from the user device 101 (e.g. via the user interface of the user device 101).

At step 618, the browser application 110 transmits an approval response to the IMAS 135 indicating the user consent.

In certain embodiments, however, the IMAS 135 does not perform the steps 617 and 618 to request and receive user consent based on the custom scopes information of the oauth request.

At step 619, the IMAS 135, upon validation of the application instance-specific credentials 119 (e.g. the client ID and the secret received in the OAuth request), generates an authorization code ("authz code") and transmits the authz code to the browser application 110. In certain embodiments, the IMAS 135, upon validation of the client ID and the secret received in the OAuth request and receipt of the user consent response from the browser application 110 at step 618, generates an authorization code ("authz code") and transmits the authz code to the browser application 110. The IMAS 135 stores the authz code and associates the authz code with the application instance 117. In some instances, the authz code is a temporary authz code that is valid for a predefined length of time.

At step 620, the browser application 110 transmits the authz code received from the IMAS 135 to the application instance 117. For example, the application instance 117 retrieves the authz code from the browser application 110 and stores the authz code on the user device 101.

At step 621, the application instance 117 transmits an access token request including the authz code to the IMAS 135. The IMAS 135 validates the authz code received in the access token request and, upon successful validation, the IMAS 135 generates an access token. Successful validation includes comparing the received authorization code to the authorization code stored by the IMAS 135 to determine a match. The access token, in some embodiments, has a one time usage, is valid for a predefined length of time, and is scoped to perform a particular functionality of accessing information from a third party access provider (TPAP) 140. The IMAS 135 stores the access token.

At step 622, the IMAS 135 transmits the access token to the application instance 117, which stores the access token. The IMAS 135 also transmits the access token to the TPAP 140, which stores the access token and associates the access token with the application instance 117. The IMAS 135 associates the access token with the application instance 117. Optionally, in addition to the requested access token, the IMAS 135 may transmit additional information to the application instance 117, including one or more identity and refresh tokens.

In certain embodiments, the application instance 117 then uses the access token received from the IMAS 135 at step 622 to perform the desired business function (e.g., accessing account data, performing a transaction, updating user information, etc.) by accessing one or more resources or other services of the TPAP 140. For example, the application instance 117 can transmit a service request to one or more computing devices of the TPAP 140 along with the access token and the TPAP 140 grants access to the one or more requested resources (e.g. protected resources) or other services responsive to receiving the access token. The service request can include a request to access data stored in a data storage unit of the TPAP 140 or a request for the TPAP 140 to perform one or more services for the application instance 117. Upon validation of the access token received in the service request, the TPAP 140 accesses the requested data, performs the requested services, or otherwise processes the service request. The application instance 117 receives, from the TPAP 140, the requested data and/or an output of the services requested in the service request. Validation of the access token by the TPAP 140 includes accessing, by the TPAP 140, the access token from the data storage unit and determining that the stored access token matches the received access token received in the service request.

Figure 7:
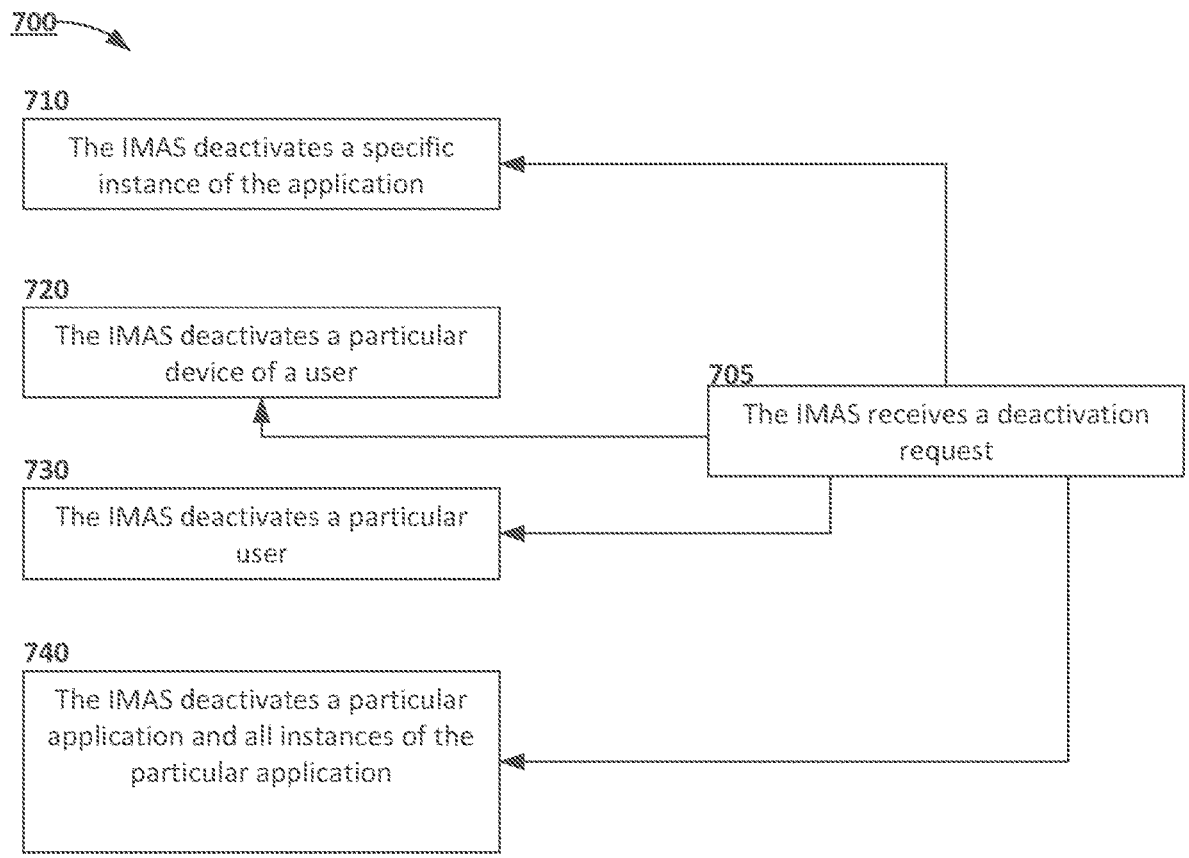
FIG. 7 is a block flow diagram depicting processing performed by an IMAS to selectively deactivate a specific application instance, application instances on a user device, application instances associated with user, or all application instances associated with an application, according to certain embodiments.

FIG. 7 is a block flow diagram depicting processing performed by an IMAS 135 to selectively deactivate a specific application instance 117, application instances 117 on a user device 101, application instances 117 associated with user, or all application instances 117 associated with an application, according to certain embodiments. As previously described, The application instance specific credentials 119 (e.g. the client ID and the secret) are unique to the application instance 117 being registered. Accordingly, different application instance-specific credentials 117 will be generated by the IMAS 135 for different application instances 117 downloaded (e.g. initially downloaded as template applications 115) and registered by the same user on different user devices 101 or different application instances 117 downloaded by different users on one or more user devices 101. In certain embodiments, the IMAS 135 stores association information including associations between the generated application instance-specific credentials 119 (e.g. the client ID and the secret), the requesting user, the user device 101 on which the application instance 117 being registered is installed, and the service name ID 201. The IMAS 135 stores the application instance-specific credentials 119 and the associations in a data storage unit accessible to the IMAS 135. The IMAS 135 stores an association between the user, the application instance-specific credentials 119, and an identifier associated with the user device 101 on which the application instance 117 operates. This stored, associated information may be used to easily and efficiently deactivate a specific application instance 117 on a particular user device 101, deactivate all application instances 117 of multiple users of an application, deactivate application instances 117, associated with a plurality of applications, on a particular user device 101, deactivate all application instances 117 associated with a particular user, or deactivate all application instances 117 (and/or template applications 115) associated with an application.

At block 705, the IMAS 135 receives a deactivation request. In certain examples, the IMAS 135 receives the deactivation request from a third party access provider (TPAP) 140. For example, the TPAP 140 requests that the IMAS 135 deactivate an application instance 117 where the user has failed to pay a subscription fee to a service provided by the service application associated with the application instance 117. In some instances, the IMAS 135 receives a deactivation request from a user or from a user device 101. For example, the user lost his or her user device 101 and requests, using another user device 101 that the IMAS 135 deactivate a specific application instance 117 on the missing user device 101 or all application instances 117 (and/or template applications 115) known to the IMAS 135 on the missing user device 101. In some instances, the IMAS 135.

In some embodiments, the method 700 proceeds from block 705 to block 710. For example, the deactivation request of block 705 includes a request to deactivate a specific application instance 117 on a specific user device 101. At block 710, the IMAS deactivates a specific instance of the application. Further details describing an example of how the IMAS 135 can deactivate a specific application instance 117 are described herein in FIG. 8.

In some embodiments, the method 700 proceeds from block 705 to block 720. For example, the deactivation request of block 705 includes a request to deactivate a specific user device 101 and all application instances 117 on the specific user device 101. At block 720, the IMAS 135 deactivates a particular user device 101 of a user. Further details describing an example of how the IMAS 135 can deactivate all application instances 117 on a specific user device 101 are described herein in FIG. 9.

In some embodiments, the method 700 proceeds from block 705 to block 730. For example, the deactivation request of block 705 includes a request to deactivate all application instances 117 associated with a particular user. At block 730, the IMAS 135 deactivates a particular user. Further details describing an example of how the IMAS 135 can deactivate all application instances 117 associated with a specific user are described herein in FIG. 10.

In some embodiments, the method 700 proceeds from block 705 to block 740. For example, the deactivation request of block 705 includes a request to deactivate all application instances 117 associated with a particular service application. At block 740, the IMAS 135 deactivates a particular application and all instances of the particular application. Further details describing an example of how the IMAS 135 can deactivate all application instances 117 associated with a service application are described herein in FIG. 11.

Figure 8:
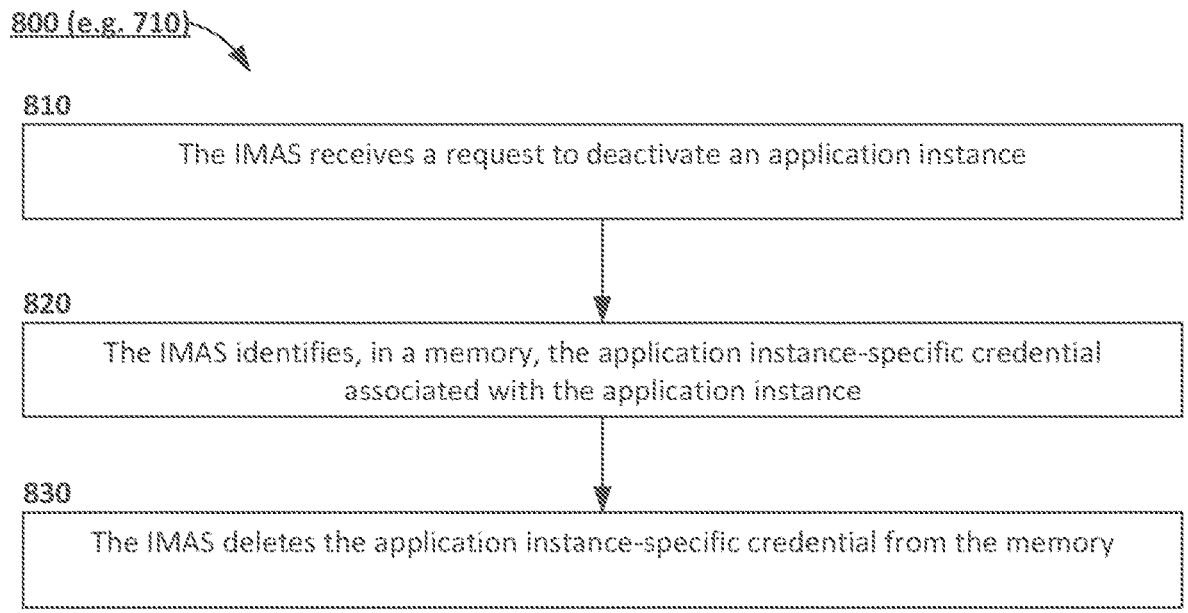
FIG. 8 is a block flow diagram depicting processing performed by an IMAS to deactivate a specific application instance, according to certain embodiments.

FIG. 8 is a block flow diagram depicting processing 800 performed by an IMAS to deactivate a specific application instance, according to certain embodiments. The processing depicted in FIG. 8 may be implemented in software (e.g., code, instructions, program) executed by one or more processing units (e.g., processors, cores) of the respective systems, in hardware, or combinations thereof. The software may be stored on a non-transitory computer-readable storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel.

At block 810, the IMAS 135 receives a request to deactivate an application instance 117. In an example, the IMAS 135 identifies the application instance 117 based on an application instance 117 identifier received in the request to deactivate. In some instances, the IMAS 135 can identify the application instance 117 (e.g. application instance I 205) based a user identifier 203 and user device information 208 received in the request to deactivate. For example, as depicted in FIG. 2, the IMAS 135 can store application instance specific information 138 associated with a user identifier (e.g. user I identifier 203), where the application instance specific information includes, for each application instance downloaded by the user, include application instance specific credentials 207 and user device information 208.

At block 820, the IMAS 135 identifies, in a memory, the application instance specific credential 119 associated with the application instance 117. For example, as shown in FIG. 2, the IMAS 135 can store application instance specific information 138 associated with a user identifier of a user that includes, for each application instance registered for the user, respective application instance specific credentials 117. For example, in FIG. 2, the IMAS 135 can identify application instance specific credentials 207 associated with the application instance I 205 in the application instance specific information 138 associated with the user I identifier 203.

At block 830, the IMAS 135 deletes the application instance-specific credential 119 from the memory. In certain examples, when the application instance-specific credential 119 is deleted, the IMAS 135 is unable to validate an application instance-specific credential 119 of the application instance 117 if the application instance 117 requests an access token and, therefore, the application instance 117 is unable to access protected resources of the TPAP 140 using the application instance-specific credential 119.

Figure 9:
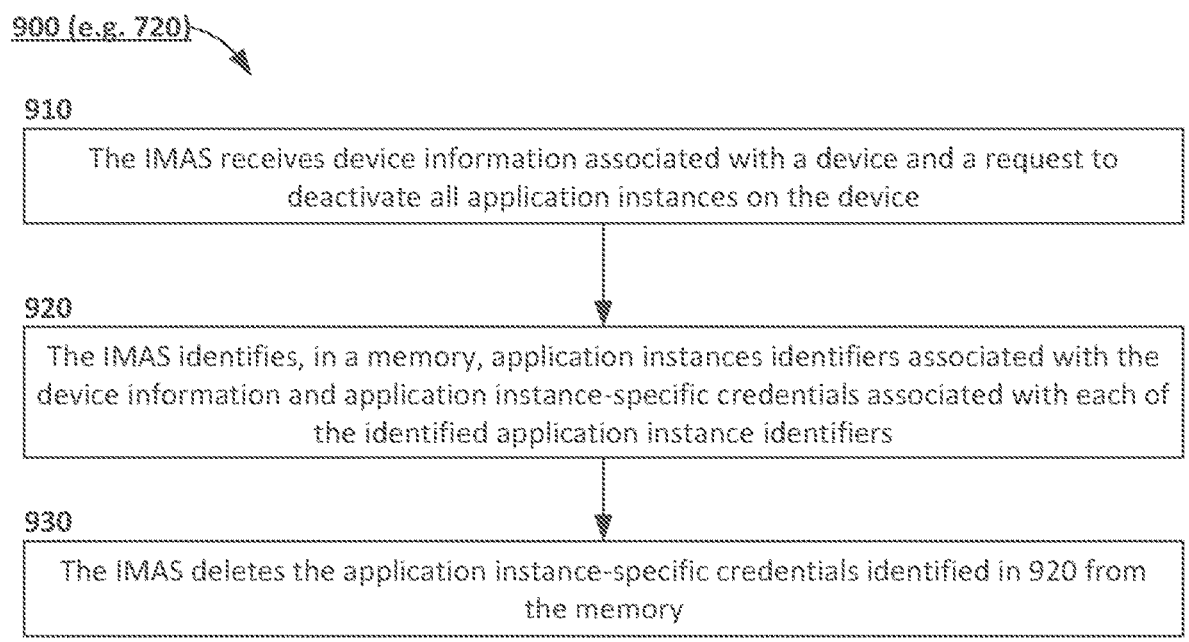
FIG. 9 is a block flow diagram depicting processing performed by an IMAS to deactivate application instances on a user device, according to certain embodiments.

FIG. 9 is a block flow diagram depicting processing 900 performed by an IMAS to deactivate application instances on a user device, according to certain embodiments. The processing depicted in FIG. 9 may be implemented in software (e.g., code, instructions, program) executed by one or more processing units (e.g., processors, cores) of the respective systems, in hardware, or combinations thereof. The software may be stored on a non-transitory computer-readable storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in some different order or some steps may also be performed in parallel At block 910, the IMAS 135 receives device information associated with a device and a request to deactivate all application instances on the device. In an example, the IMAS 135 identifies the user device 101 based on a user device 101 identifier received in the request to deactivate. The application instances 117 on a user device 101 can be associated with a plurality of service applications. For example, the user could have, on a same user device X identified in the deactivation request, an application instance 117 of service application A. an application instance 117 of service application B, and an application instance 117 of service application C.

At block 920, the IMAS 135 identifies, in a memory, application instance identifiers associated with the device information and application instance-specific credentials associated with each of the identified application instance identifiers. In some instances, the IMAS 135 can identify the application instances 117 (e.g. application instance I 205 of FIG. 2) associated with each of multiple user identifiers and, for application instances associated with device information identifying the specific user device 101, identify the associated application instance specific credentials 119. For example, in FIG. 2, application instance specific credentials 207 correspond to application instance I 205 which is registered on a user device 101 associated with device information 208.

At block 930, the IMAS 135 deletes the application instance-specific credentials 119 identified in block 920 from the memory. In certain examples, when the application instance-specific credentials 119 for application instances 117 registered on the specific user device 101 are deleted, the IMAS 135 is unable to validate application instance-specific credentials 119 of any application instance 117 on the user device 101 if the application instance 117 requests an access token and, therefore, the application instance 117 is unable to access protected resources of the TPAP 140 using its respective application instance-specific credentials 119.

FIG. 10 is a block flow diagram depicting processing 1000 performed by an IMAS to deactivate application instances associated with a user, according to certain embodiments. The processing depicted in FIG. 10 may be implemented in software (e.g., code, instructions, program) executed by one or more processing units (e.g., processors, cores) of the respective systems, in hardware, or combinations thereof. The software may be stored on a non-transitory computer-readable storage medium (e.g., on a memory device). The method presented in FIG. 10 and described below is intended to be illustrative and non-limiting. Although FIG. 10 depicts the various processing steps occurring in a particular sequence or order, this is not intended to be limiting. In certain alternative embodiments, the steps may be performed in some different order or some steps may also be performed in parallel.

At block 1010, the IMAS 135 receives a user identifier identifying a user and a request to deactivate application instances associated with the user. In an example, the IMAS 135 identifies the user based on a user identifier received in the request to deactivate. The application instances 117 associated with the user may be associated with a plurality of applications and be registered on a plurality of user devices 101. For example, the user could have a first application instance 117 of service application A on user device X, a second application instance 117 of service application A on user device Y, a first application instance 117 of service application B on user device Y, and a second application instance 117 of service application B on user device Z.

At block 1020, the IMAS 135 identifies, in a memory, application instance identifiers associated with the user identifier and application instance-specific credentials associated with each of the identified application instance identifiers. In some instances, the IMAS 135 can identify the application instances 117 associated with the user identifier and identify the application instance specific credentials 119 associated with each of the identified application instances 117. For example, in FIG. 2, the IMAS 135 can identify the application instance specific information 138 associated with the user I identifier 203 and identify the application instance specific credentials for each application instance 117 in the application instance specific information 138. For example, application instance specific credentials 207 are associated with application instance I 205, which is associated with the user I identifier 203.

At block 1030, the IMAS 135 deletes the application instance-specific credentials 119 identified in 1020 from the memory. In certain examples, when the application instance-specific credentials 119 for application instances 117 associated with the user are deleted, the IMAS 135 is unable to validate application instance-specific credentials 119 of any application instances 117, no matter on which user device 101 the application instance 117 is registered and no matter with which service application(s) the application instances 117 are associated. For example, if an application instance 117 corresponding to a deleted application instance specific credential 119 requests an access token, the IMAS 135 is unable to validate received application instance specific credentials 119 (because the corresponding stored credential is deleted from the memory), and the application instance 117 is therefore unable to access protected resources of the TPAP 140 using its respective application instance-specific credentials 119.

FIG. 11 is a block flow diagram depicting processing performed by an IMAS to deactivate all application instances associated with an application, according to certain embodiments. The processing 1100 depicted in FIG. 11 may be implemented in software (e.g., code, instructions, program) executed by one or more processing units (e.g., processors, cores) of the respective systems, in hardware, or combinations thereof. The software may be stored on a non-transitory computer-readable storage medium (e.g., on a memory device). The method presented in FIG. 11 and described below is intended to be illustrative and non-limiting. Although FIG. 11 depicts the various processing steps occurring in a particular sequence or order, this is not intended to be limiting. In certain alternative embodiments, the steps may be performed in some different order or some steps may also be performed in parallel At block 1110, the IMAS 135 receives a service identifier identifying an application and a request to deactivate application instances of an application identified by the service identifier. The application instances 117 associated with the application (e.g. a service application) may be registered on a plurality of user devices 101 and associated with a plurality of different users. As shown in FIG. 2, each application (e.g. application I 133) known to the IMAS 135 is associated with a service application identifier 201. The service application identifier 201 is shared by all downloaded template applications 115 and application instances 117 associated with the application.

At block 1120, the IMAS 135 deletes, from a memory, the service identifier. For example, if an application instance 117 corresponding to a deleted service identifier requests an access token, the IMAS 135 is unable to validate received service identifier, and the application instance 117 is therefore unable to access protected resources of the TPAP 140 using its respective application instance-specific credentials 119. In another example, if a template application 115 corresponding to a deleted service identifier requests to be registered, the IMAS 135 is unable to validate the received service identifier, and the template application 115 is unable to be registered by the IMAS 135 as an application instance 117.

In certain embodiments, the IMAS 135 receives a request to deactivate all template applications 115 associated with a service identifier but not deactivate application instances 117 associated with the service identifier. In these embodiments, the IMAS 135 identifies the template identifier based on the received service identifier. For example, as shown in FIG. 2, for each application listed in the application information 139, the IMAS 135 can identify a template identifier 202. The IMAS 135 deletes the template identifier (e.g. template application credentials 113) from the memory. If a template application 115 corresponding to a deleted template identifier requests to be registered, the IMAS 135 is unable to validate the received template identifier, and the template application 115 is unable to be registered by the IMAS 135 as an application instance 117.

Example Infrastructure as a Service (Iaas) Architecture

As noted above, infrastructure as a service (IaaS) is one particular type of cloud computing. IaaS can be configured to provide virtualized cloud services providers over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared cloud services providers), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 12:
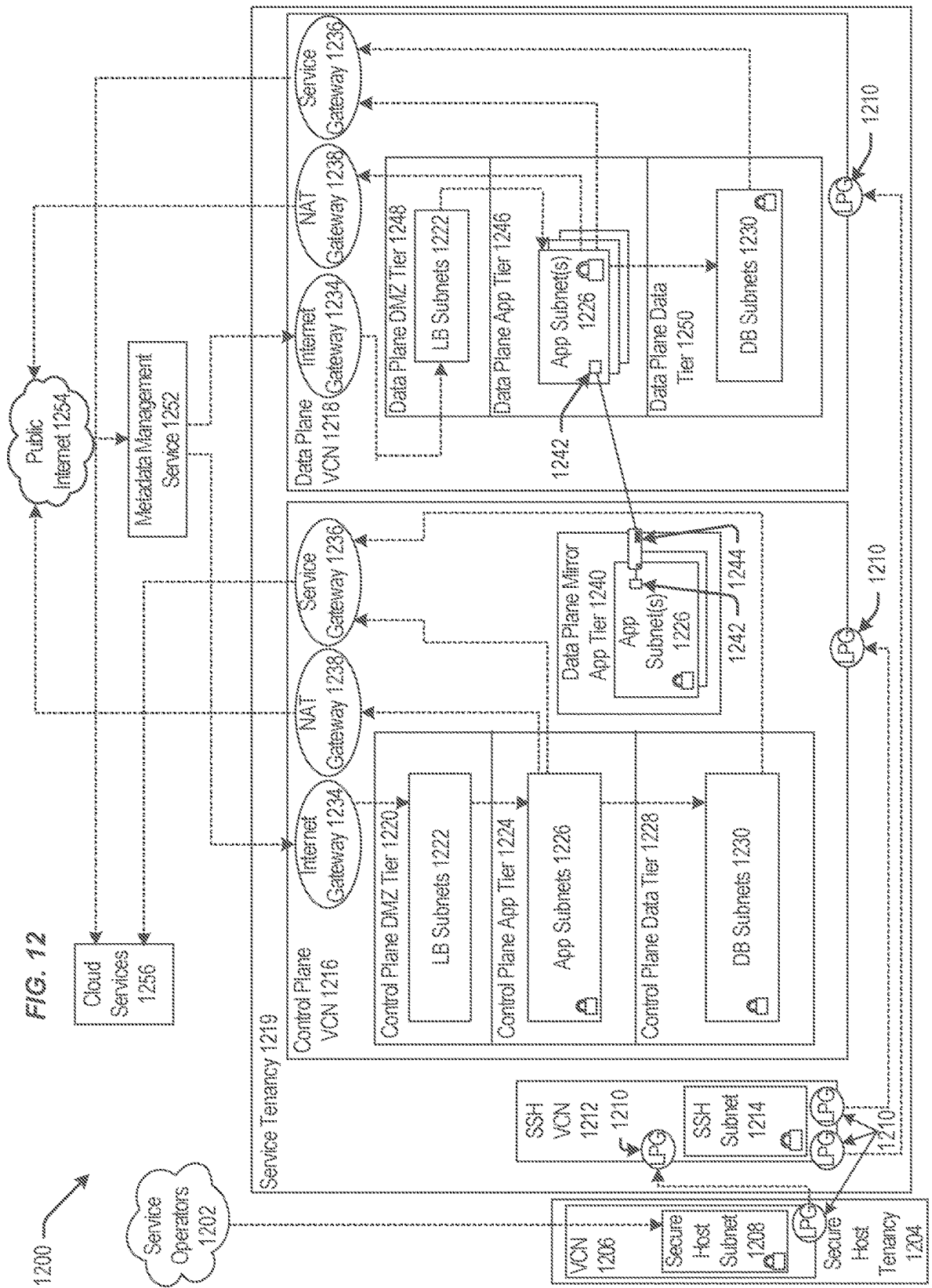
FIG. 12 is a block diagram illustrating one pattern for implementing a cloud infrastructure as a service system, according to at least one embodiment.

FIG. 12 is a block diagram 1200 illustrating an example pattern of an IaaS architecture, according to at least one embodiment. Service operators 1202 can be communicatively coupled to a secure host tenancy 121204 that can include a virtual cloud network (VCN) 1206 and a secure host subnet 1208. In some examples, the service operators 1202 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1206 and/or the Internet.

The VCN 1206 can include a local peering gateway (LPG) 1210 that can be communicatively coupled to a secure shell (SSH) VCN 1212 via an LPG 1210 contained in the SSH VCN 1212. The SSH VCN 1212 can include an SSH subnet 1214, and the SSH VCN 1212 can be communicatively coupled to a control plane VCN 1216 via the LPG 1210 contained in the control plane VCN 1216. Also, the SSH VCN 1212 can be communicatively coupled to a data plane VCN 1218 via an LPG 1210. The control plane VCN 1216 and the data plane VCN 1218 can be contained in a service tenancy 1219 that can be owned and/or operated by the IaaS provider.

The control plane VCN 1216 can include a control plane demilitarized zone (DMZ) tier 1220 that acts as a perimeter network (e.g., portions of a corporate network between the corporate intranet and external networks). The DMZ-based servers may have restricted responsibilities and help keep breaches contained. Additionally, the DMZ tier 1220 can include one or more load balancer (LB) subnet(s) 1222, a control plane app tier 1224 that can include app subnet(s) 1226, a control plane data tier 1228 that can include database (DB) subnet(s) 1230 (e.g., frontend DB subnet(s) and/or backend DB subnet(s)). The LB subnet(s) 1222 contained in the control plane DMZ tier 1220 can be communicatively coupled to the app subnet(s) 1226 contained in the control plane app tier 1224 and an Internet gateway 1234 that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238. The control plane VCN 1216 can include the service gateway 1236 and the NAT gateway 1238.

The control plane VCN 1216 can include a data plane mirror app tier 1240 that can include app subnet(s) 1226. The app subnet(s) 1226 contained in the data plane mirror app tier 1240 can include a virtual network interface controller (VNIC) 1242 that can execute a compute instance 1244. The compute instance 1244 can communicatively couple the app subnet(s) 1226 of the data plane mirror app tier 1240 to app subnet(s) 1226 that can be contained in a data plane app tier 1246.

The data plane VCN 1218 can include the data plane app tier 1246, a data plane DMZ tier 1248, and a data plane data tier 1250. The data plane DMZ tier 1248 can include LB subnet(s) 1222 that can be communicatively coupled to the app subnet(s) 1226 of the data plane app tier 1246 and the Internet gateway 1234 of the data plane VCN 1218. The app subnet(s) 1226 can be communicatively coupled to the service gateway 1236 of the data plane VCN 1218 and the NAT gateway 1238 of the data plane VCN 1218. The data plane data tier 1250 can also include the DB subnet(s) 1230 that can be communicatively coupled to the app subnet(s) 1226 of the data plane app tier 1246.

The Internet gateway 1234 of the control plane VCN 1216 and of the data plane VCN 1218 can be communicatively coupled to a metadata management service 1321252 that can be communicatively coupled to public Internet 1254. Public Internet 1254 can be communicatively coupled to the NAT gateway 1238 of the control plane VCN 1216 and of the data plane VCN 1218. The service gateway 1236 of the control plane VCN 1216 and of the data plane VCN 1218 can be communicatively couple to cloud services 1256.

In some examples, the service gateway 1236 of the control plane VCN 1216 or of the data plane VCN 1218 can make application programming interface (API) calls to cloud services 1256 without going through public Internet 1254. The API calls to cloud services 1256 from the service gateway 1236 can be one-way: the service gateway 1236 can make API calls to cloud services 1256, and cloud services 1256 can send requested data to the service gateway 1236. But, cloud services 1256 may not initiate API calls to the service gateway 1236.

In some examples, the secure host tenancy 121204 can be directly connected to the service tenancy 1219, which may be otherwise isolated. The secure host subnet 1208 can communicate with the SSH subnet 1214 through an LPG 1210 that may enable two-way communication over an otherwise isolated system. Connecting the secure host subnet 1208 to the SSH subnet 1214 may give the secure host subnet 1208 access to other entities within the service tenancy 1219.

The control plane VCN 1216 may allow users of the service tenancy 1219 to set up or otherwise provision desired resources. Desired resources provisioned in the control plane VCN 1216 may be deployed or otherwise used in the data plane VCN 1218. In some examples, the control plane VCN 1216 can be isolated from the data plane VCN 1218, and the data plane mirror app tier 1240 of the control plane VCN 1216 can communicate with the data plane app tier 1246 of the data plane VCN 1218 via VNICs 1242 that can be contained in the data plane mirror app tier 1240 and the data plane app tier 1246.

In some examples, users of the system, or customers, can make requests, for example create, read, update, or delete (CRUD) operations, through public Internet 1254 that can communicate the requests to the metadata management service 1252. The metadata management service 1252 can communicate the request to the control plane VCN 1216 through the Internet gateway 1234. The request can be received by the LB subnet(s) 1222 contained in the control plane DMZ tier 1220. The LB subnet(s) 1222 may determine that the request is valid, and in response to this determination, the LB subnet(s) 1222 can transmit the request to app subnet(s) 1226 contained in the control plane app tier 1224. If the request is validated and requires a call to public Internet 1254, the call to public Internet 1254 may be transmitted to the NAT gateway 1238 that can make the call to public Internet 1254. Memory that may be desired to be stored by the request can be stored in the DB subnet(s) 1230.

In some examples, the data plane mirror app tier 1240 can facilitate direct communication between the control plane VCN 1216 and the data plane VCN 1218. For example, changes, updates, or other suitable modifications to configuration may be desired to be applied to the resources contained in the data plane VCN 1218. Via a VNIC 1242, the control plane VCN 1216 can directly communicate with, and can thereby execute the changes, updates, or other suitable modifications to configuration to, resources contained in the data plane VCN In some embodiments, the control plane VCN 1216 and the data plane VCN 1218 can be contained in the service tenancy 1219. In this case, the user, or the customer, of the system may not own or operate either the control plane VCN 1216 or the data plane VCN 1218. Instead, the IaaS provider may own or operate the control plane VCN 1216 and the data plane VCN 1218, both of which may be contained in the service tenancy 1219. This embodiment can enable isolation of networks that may prevent users or customers from interacting with other users', or other customers', resources. Also, this embodiment may allow users or customers of the system to store databases privately without needing to rely on public Internet 1254, which may not have a desired level of threat prevention, for storage.

In other embodiments, the LB subnet(s) 1222 contained in the control plane VCN 1216 can be configured to receive a signal from the service gateway 1236. In this embodiment, the control plane VCN 1216 and the data plane VCN 1218 may be configured to be called by a customer of the IaaS provider without calling public Internet 1254. Customers of the IaaS provider may desire this embodiment since database(s) that the customers use may be controlled by the IaaS provider and may be stored on the service tenancy 1219, which may be isolated from public Internet 1254.

Figure 13:
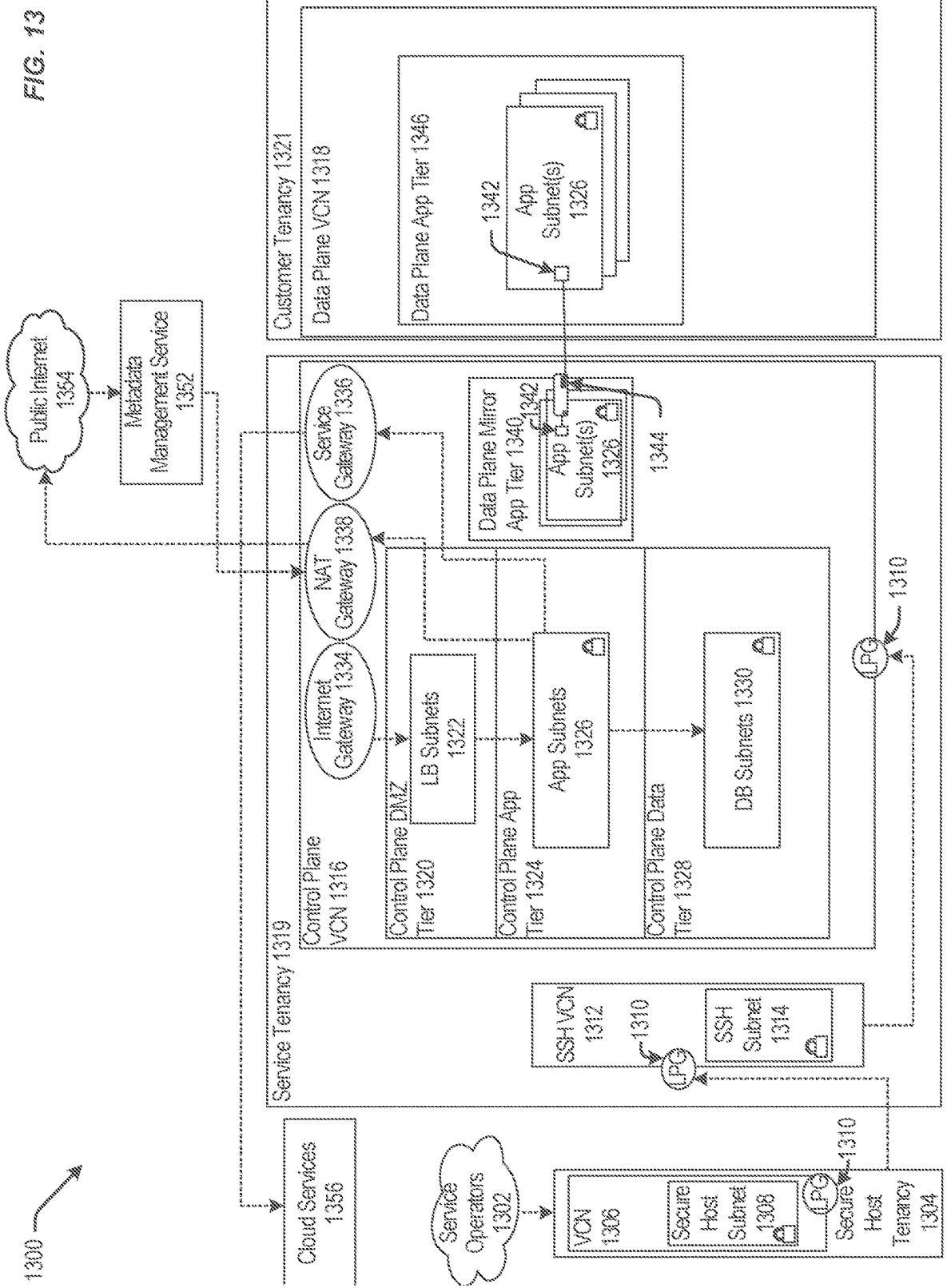
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1202 of FIG. 12) can be communicatively coupled to a secure host tenancy 1304 (e.g. the secure host tenancy 121204 of FIG. 12) that can include a virtual cloud network (VCN) 1306 (e.g. the VCN 1206 of FIG. 12) and a secure host subnet 1308 (e.g. the secure host subnet 1208 of FIG. 12). The VCN 1306 can include a local peering gateway (LPG) 1310 (e.g. the LPG 1210 of FIG. 12) that can be communicatively coupled to a secure shell (SSH) VCN 1312 (e.g. the SSH VCN 1212 of FIG. 12) via an LPG 1210 contained in the SSH VCN 1312. The SSH VCN 1312 can include an SSH subnet 1314 (e.g. the SSH subnet 1214 of FIG. 12), and the SSH VCN 1312 can be communicatively coupled to a control plane VCN 1316 (e.g. the control plane VCN 1216 of FIG. 12) via an LPG 1310 contained in the control plane VCN 1316. The control plane VCN 1316 can be contained in a service tenancy 1319 (e.g. the service tenancy 1219 of FIG. 12), and the data plane VCN 1318 (e.g. the data plane VCN 1218 of FIG. 12) can be contained in a customer tenancy 1321 that may be owned or operated by users, or customers, of the system.

The control plane VCN 1316 can include a control plane DMZ tier 1320 (e.g. the control plane DMZ tier 1220 of FIG. 12) that can include LB subnet(s) 1322 (e.g. LB subnet(s) 1222 of FIG. 12), a control plane app tier 1324 (e.g. the control plane app tier 1224 of FIG. 12) that can include app subnet(s) 1326 (e.g. app subnet(s) 1226 of FIG. 12), a control plane data tier 1328 (e.g. the control plane data tier 1228 of FIG. 12) that can include database (DB) subnet(s) 1330 (e.g. similar to DB subnet(s) 1230 of FIG. 12). The LB subnet(s) 1322 contained in the control plane DMZ tier 1320 can be communicatively coupled to the app subnet(s) 1326 contained in the control plane app tier 1324 and an Internet gateway 1334 (e.g. the Internet gateway 1234 of FIG. 12) that can be contained in the control plane VCN 1316, and the app subnet(s) 1326 can be communicatively coupled to the DB subnet(s) 1330 contained in the control plane data tier 1328 and a service gateway 1336 (e.g. the service gateway of FIG. 12) and a network address translation (NAT) gateway 1338 (e.g. the NAT gateway 1238 of FIG. 12). The control plane VCN 1316 can include the service gateway 1336 and the NAT gateway 1338.

The control plane VCN 1316 can include a data plane mirror app tier 1340 (e.g. the data plane mirror app tier 1240 of FIG. 12) that can include app subnet(s) 1326. The app subnet(s) 1326 contained in the data plane mirror app tier 1340 can include a virtual network interface controller (VNIC) 1342 (e.g., the VNIC of 1242) that can execute a compute instance 1344 (e.g. similar to the compute instance 1244 of FIG. 12). The compute instance 1344 can facilitate communication between the app subnet(s) 1326 of the data plane mirror app tier 1340 and the app subnet(s) 1326 that can be contained in a data plane app tier 1346 (e.g., the data plane app tier 1246 of FIG. 12) via the VNIC 1342 contained in the data plane mirror app tier 1340 and the VNIC 1342 contained in the data plane app tier 1346.

The Internet gateway 1334 contained in the control plane VCN 1316 can be communicatively coupled to a metadata management service 1352 (e.g., the metadata management service 1321252 of FIG. 12) that can be communicatively coupled to public Internet 1354 (e.g., public Internet 1254 of FIG. 12). Public Internet 1354 can be communicatively coupled to the NAT gateway 1338 contained in the control plane VCN 1316. The service gateway 1336 contained in the control plane VCN 1316 can be communicatively couple to cloud services 1356 (e.g., cloud services 1256 of FIG. 12).

In some examples, the data plane VCN 1318 can be contained in the customer tenancy 1321. In this case, the IaaS provider may provide the control plane VCN 1316 for each customer, and the IaaS provider may, for each customer, set up a unique compute instance 1344 that is contained in the service tenancy 1319. Each compute instance 1344 may allow communication between the control plane VCN 1316, contained in the service tenancy 1319, and the data plane VCN 1318 that is contained in the customer tenancy 1321. The compute instance 1344 may allow resources, that are provisioned in the control plane VCN 1316 that is contained in the service tenancy 1319, to be deployed or otherwise used in the data plane VCN 1318 that is contained in the customer tenancy 1321.

In other examples, the customer of the IaaS provider may have databases that live in the customer tenancy 1321. In this example, the control plane VCN 1316 can include the data plane mirror app tier 1340 that can include app subnet(s) 1326. The data plane mirror app tier 1340 can reside in the data plane VCN 1318, but the data plane mirror app tier 1340 may not live in the data plane VCN 1318. That is, the data plane mirror app tier 1340 may have access to the customer tenancy 1321, but the data plane mirror app tier 1340 may not exist in the data plane VCN 1318 or be owned or operated by the customer of the IaaS provider. The data plane mirror app tier 1340 may be configured to make calls to the data plane VCN 1318 but may not be configured to make calls to any entity contained in the control plane VCN 1316. The customer may desire to deploy or otherwise use resources in the data plane VCN 1318 that are provisioned in the control plane VCN 1316, and the data plane mirror app tier 1340 can facilitate the desired deployment, or other usage of resources, of the customer.

In some embodiments, the customer of the IaaS provider can apply filters to the data plane VCN 1318. In this embodiment, the customer can determine what the data plane VCN 1318 can access, and the customer may restrict access to public Internet 1354 from the data plane VCN 1318. The IaaS provider may not be able to apply filters or otherwise control access of the data plane VCN 1318 to any outside networks or databases. Applying filters and controls by the customer onto the data plane VCN 1318, contained in the customer tenancy 1321, can help isolate the data plane VCN 1318 from other customers and from public Internet 1354.

In some embodiments, cloud services 1356 can be called by the service gateway 1336 to access services that may not exist on public Internet 1354, on the control plane VCN 1316, or on the data plane VCN 1318. The connection between cloud services 1356 and the control plane VCN 1316 or the data plane VCN 1318 may not be live or continuous. Cloud services 1356 may exist on a different network owned or operated by the IaaS provider. Cloud services 1356 may be configured to receive calls from the service gateway 1336 and may be configured to not receive calls from public Internet 1354. Some cloud services 1356 may be isolated from other cloud services 1356, and the control plane VCN 1316 may be isolated from cloud services 1356 that may not be in the same region as the control plane VCN 1316. For example, the control plane VCN 1316 may be located in "Region 1," and cloud service "Deployment 11," may be located in Region 1 and in "Region 2." If a call to Deployment 11 is made by the service gateway 1336 contained in the control plane VCN 1316 located in Region 1, the call may be transmitted to Deployment 11 in Region 1. In this example, the control plane VCN 1316, or Deployment 11 in Region 1, may not be communicatively coupled to, or otherwise in communication with, Deployment 11 in Region 2.

Figure 14:
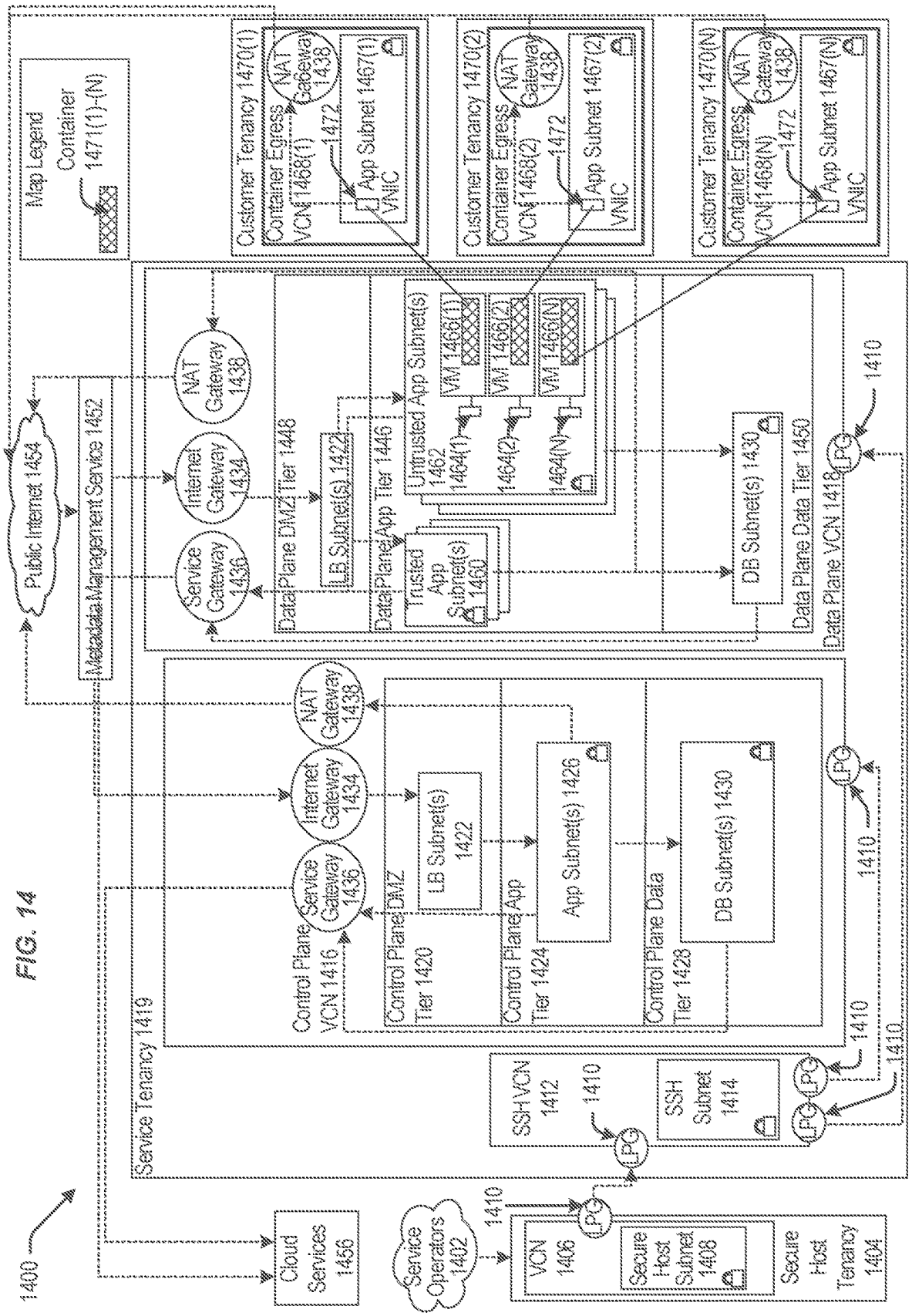
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1202 of FIG. 12) can be communicatively coupled to a secure host tenancy 1404 (e.g. the secure host tenancy 1204 of FIG. 12) that can include a virtual cloud network (VCN) 1406 (e.g. the VCN 1206 of FIG. 12) and a secure host subnet 1408 (e.g. the secure host subnet 1208 of FIG. 12). The VCN 1406 can include an LPG 1410 (e.g. the LPG 1210 of FIG. 12) that can be communicatively coupled to an SSH VCN 1412 (e.g. the SSH VCN 1212 of FIG. 12) via an LPG 1410 contained in the SSH VCN 1412. The SSH VCN 1412 can include an SSH subnet 1414 (e.g. the SSH subnet 1214 of FIG. 12), and the SSH VCN 1412 can be communicatively coupled to a control plane VCN 1416 (e.g. the control plane VCN 1216 of FIG. 12) via an LPG 1410 contained in the control plane VCN 1416 and to a data plane VCN 1418 (e.g. the data plane 1218 of FIG. 12) via an LPG 1410 contained in the data plane VCN 1418. The control plane VCN 1416 and the data plane VCN 1418 can be contained in a service tenancy 1419 (e.g. the service tenancy 1219 of FIG. 12).

The control plane VCN 1416 can include a control plane DMZ tier 1420 (e.g. the control plane DMZ tier 1220 of FIG. 12) that can include load balancer (LB) subnet(s) 1422 (e.g. LB subnet(s) 1222 of FIG. 12), a control plane app tier 1424 (e.g. the control plane app tier 1224 of FIG. 12) that can include app subnet(s) 1426 (e.g. similar to app subnet(s) 1226 of FIG. 12), a control plane data tier 1428 (e.g. the control plane data tier 1228 of FIG. 12) that can include DB subnet(s) 1430. The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1234 of FIG. 12) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 12) and a network address translation (NAT) gateway 1438 (e.g. the NAT gateway 1238 of FIG. 12). The control plane VCN 1416 can include the service gateway 1436 and the NAT gateway 1438.

The data plane VCN 1418 can include a data plane app tier 1446 (e.g. the data plane app tier 1246 of FIG. 12), a data plane DMZ tier 1448 (e.g. the data plane DMZ tier 1248 of FIG. 12), and a data plane data tier 1450 (e.g. the data plane data tier 1250 of FIG. 12). The data plane DMZ tier 1448 can include LB subnet(s) 1422 that can be communicatively coupled to trusted app subnet(s) 1460 and untrusted app subnet(s) 1462 of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include one or more primary VNICs 1464(1)-(N) that can be communicatively coupled to tenant virtual machines (VMs) 1466(1)-(N). Each tenant VM 1466(1)-(N) can be communicatively coupled to a respective app subnet 1415 1467(1)-(N) that can be contained in respective container egress VCNs 1468(1)-(N) that can be contained in respective customer tenancies 1470(1)-(N). Respective secondary VNICs 1472(1)-(N) can facilitate communication between the untrusted app subnet(s) 1462 contained in the data plane VCN 1418 and the app subnet contained in the container egress VCNs 1468(1)-(N). Each container egress VCNs 1468(1)-(N) can include a NAT gateway 1438 that can be communicatively coupled to public Internet 1454 (e.g. public Internet 1254 of FIG. 12).

The Internet gateway 1434 contained in the control plane VCN 1416 and contained in the data plane VCN 1418 can be communicatively coupled to a metadata management service 1452 (e.g. the metadata management system 1352 of FIG. 12) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some embodiments, the data plane VCN 1418 can be integrated with customer tenancies 1470. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1446. Code to run the function may be executed in the VMs 1466(1)-(N), and the code may not be configured to run anywhere else on the data plane VCN 1418. Each VM 1466(1)-(N) may be connected to one customer tenancy 1470. Respective containers 1471(1)-(N) contained in the VMs 1466(1)-(N) may be configured to run the code. In this case, there can be a dual isolation (e.g., the containers 1471(1)-(N) running code, where the containers 1471(1)-(N) may be contained in at least the VM 1466(1)-(N) that are contained in the untrusted app subnet(s) 1462), which may help prevent incorrect or otherwise undesirable code from damaging the network of the IaaS provider or from damaging a network of a different customer. The containers 1471(1)-(N) may be communicatively coupled to the customer tenancy 1470 and may be configured to transmit or receive data from the customer tenancy 1470. The containers 1471(1)-(N) may not be configured to transmit or receive data from any other entity in the data plane VCN 1418. Upon completion of running the code, the IaaS provider may kill or otherwise dispose of the containers 1471(1)-(N).

In some embodiments, the trusted app subnet(s) 1460 may run code that may be owned or operated by the IaaS provider. In this embodiment, the trusted app subnet(s) 1460 may be communicatively coupled to the DB subnet(s) 1430 and be configured to execute CRUD operations in the DB subnet(s) 1430. The untrusted app subnet(s) 1462 may be communicatively coupled to the DB subnet(s) 1430, but in this embodiment, the untrusted app subnet(s) may be configured to execute read operations in the DB subnet(s) 1430. The containers 1471(1)-(N) that can be contained in the VM 1466(1)-(N) of each customer and that may run code from the customer may not be communicatively coupled with the DB subnet(s) 1430.

In other embodiments, the control plane VCN 1416 and the data plane VCN 1418 may not be directly communicatively coupled. In this embodiment, there may be no direct communication between the control plane VCN 1416 and the data plane VCN 1418. However, communication can occur indirectly through at least one method. An LPG 1410 may be established by the IaaS provider that can facilitate communication between the control plane VCN 1416 and the data plane VCN 1418. In another example, the control plane VCN 1416 or the data plane VCN 1418 can make a call to cloud services 1456 via the service gateway 1436. For example, a call to cloud services 1456 from the control plane VCN 1416 can include a request for a service that can communicate with the data plane VCN 1418.

Figure 15:
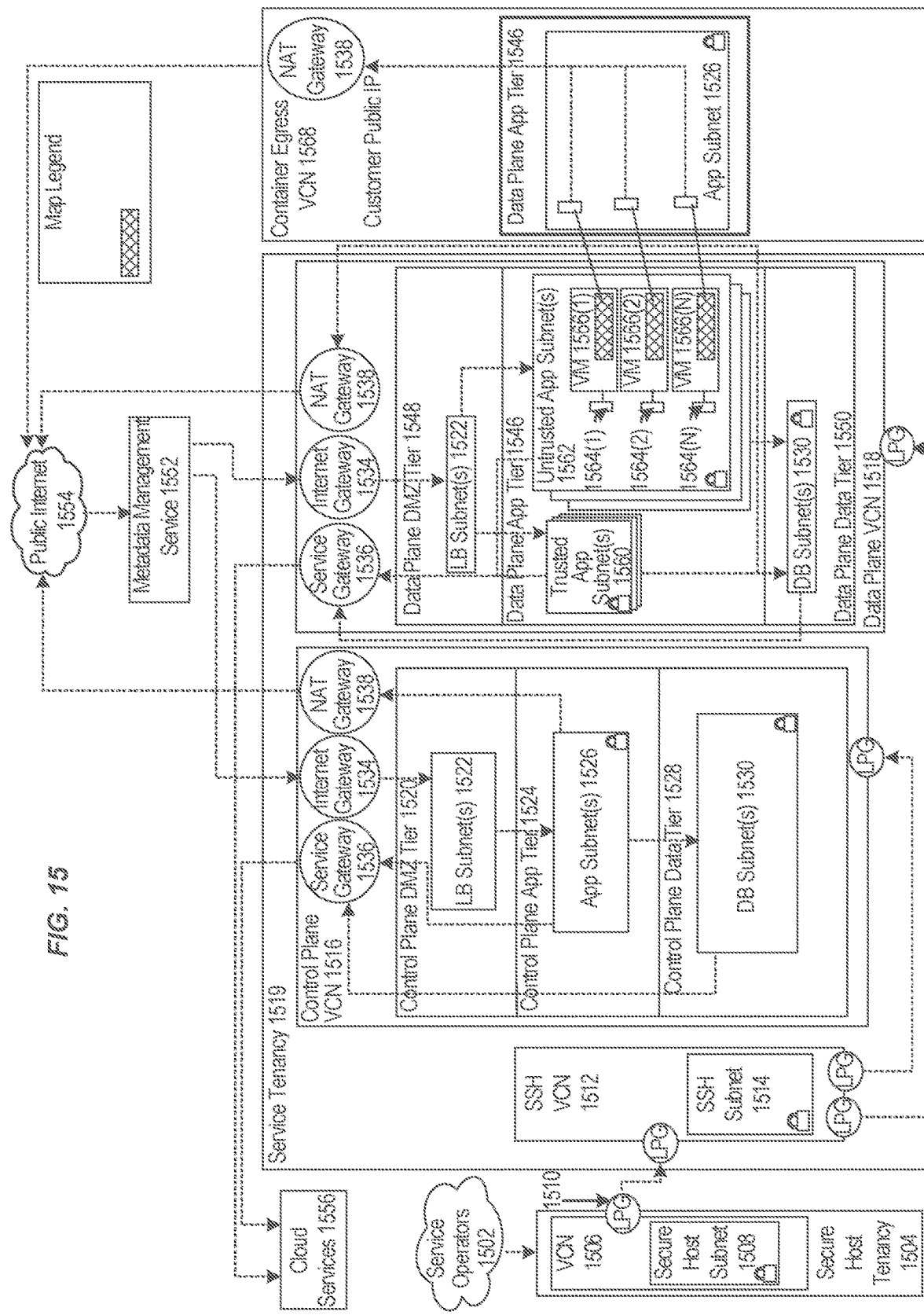
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g. service operators 1202 of FIG. 12) can be communicatively coupled to a secure host tenancy 1504 (e.g. the secure host tenancy 1204 of FIG. 12) that can include a virtual cloud network (VCN) 1506 (e.g. the VCN 1206 of FIG. 12) and a secure host subnet 1508 (e.g. the secure host subnet 1208 of FIG. 12). The VCN 1506 can include an LPG 1510 (e.g. the LPG 1210 of FIG. 12) that can be communicatively coupled to an SSH VCN 1512 (e.g. the SSH VCN 1212 of FIG. 12) via an LPG 1510 contained in the SSH VCN 1512. The SSH VCN 1512 can include an SSH subnet 1514 (e.g. the SSH subnet 1214 of FIG. 12), and the SSH VCN 1512 can be communicatively coupled to a control plane VCN 1516 (e.g. the control plane VCN 1216 of FIG. 12) via an LPG 1510 contained in the control plane VCN 1516 and to a data plane VCN 1518 (e.g. the data plane 1218 of FIG. 12) via an LPG 1510 contained in the data plane VCN 1518. The control plane VCN 1516 and the data plane VCN 1518 can be contained in a service tenancy 1519 (e.g. the service tenancy 1219 of FIG. 12).

The control plane VCN 1516 can include a control plane DMZ tier 1520 (e.g. the control plane DMZ tier 1220 of FIG. 12) that can include LB subnet(s) 1522 (e.g. LB subnet(s) 1222 of FIG. 12), a control plane app tier 1524 (e.g. the control plane app tier 1224 of FIG. 12) that can include app subnet(s) 1526 (e.g. app subnet(s) 1226 of FIG. 12), a control plane data tier 1528 (e.g. the control plane data tier 1228 of FIG. 12) that can include DB subnet(s) 1530 (e.g. DB subnet(s) 1430 of FIG. 14). The LB subnet(s) 1522 contained in the control plane DMZ tier 1520 can be communicatively coupled to the app subnet(s) 1526 contained in the control plane app tier 1524 and to an Internet gateway 1534 (e.g. the Internet gateway 1234 of FIG. 12) that can be contained in the control plane VCN 1516, and the app subnet(s) 1526 can be communicatively coupled to the DB subnet(s) 1530 contained in the control plane data tier 1528 and to a service gateway 1536 (e.g. the service gateway of FIG. 12) and a network address translation (NAT) gateway 1538 (e.g. the NAT gateway 1238 of FIG. 12). The control plane VCN 1516 can include the service gateway 1536 and the NAT gateway 1538.

The data plane VCN 1518 can include a data plane app tier 1546 (e.g. the data plane app tier 1246 of FIG. 12), a data plane DMZ tier 1548 (e.g. the data plane DMZ tier 1248 of FIG. 12), and a data plane data tier 1550 (e.g. the data plane data tier 1250 of FIG. 12). The data plane DMZ tier 1548 can include LB subnet(s) 1522 that can be communicatively coupled to trusted app subnet(s) 1560 (e.g. trusted app subnet(s) 1460 of FIG. 14) and untrusted app subnet(s) 1562 (e.g. untrusted app subnet(s) 1462 of FIG. 14) of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include primary VNICs 1564(1)-(N) that can be communicatively coupled to tenant virtual machines (VMs) 1566(1)-(N) residing within the untrusted app subnet(s) 1562. Each tenant VM 1566(1)-(N) can run code in a respective container 1567(1)-(N), and be communicatively coupled to an app subnet 1526 that can be contained in a data plane app tier 1546 that can be contained in a container egress VCN 1568. Respective secondary VNICs 1572(1)-(N) can facilitate communication between the untrusted app subnet(s) 1562 contained in the data plane VCN 1518 and the app subnet contained in the container egress VCN 1568. The container egress VCN can include a NAT gateway 1538 that can be communicatively coupled to public Internet 1554 (e.g. public Internet 1254 of FIG. 12).

The Internet gateway 1534 contained in the control plane VCN 1516 and contained in the data plane VCN 1518 can be communicatively coupled to a metadata management service 1552 (e.g. the metadata management system 1252 of FIG. 12) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some examples, the pattern illustrated by the architecture of block diagram 1500 of FIG. 15 may be considered an exception to the pattern illustrated by the architecture of block diagram 1400 of FIG. 14 and may be desirable for a customer of the IaaS provider if the IaaS provider cannot directly communicate with the customer (e.g., a disconnected region). The respective containers 1567(1)-(N) that are contained in the VMs 1566(1)-(N) for each customer can be accessed in real-time by the customer. The containers 1567(1)-(N) may be configured to make calls to respective secondary VNICs 1572(1)-(N) contained in app subnet(s) 1526 of the data plane app tier 1546 that can be contained in the container egress VCN 1568. The secondary VNICs 1572(1)-(N) can transmit the calls to the NAT gateway 1538 that may transmit the calls to public Internet 1554. In this example, the containers 1567(1)-(N) that can be accessed in real-time by the customer can be isolated from the control plane VCN 1516 and can be isolated from other entities contained in the data plane VCN 1518. The containers 1567(1)-(N) may also be isolated from resources from other customers.

In other examples, the customer can use the containers 1567(1)-(N) to call cloud services 1556. In this example, the customer may run code in the containers 1567(1)-(N) that requests a service from cloud services 1556. The containers 1567(1)-(N) can transmit this request to the secondary VNICs 1572(1)-(N) that can transmit the request to the NAT gateway that can transmit the request to public Internet 1554. Public Internet 1554 can transmit the request to LB subnet(s) 1522 contained in the control plane VCN 1516 via the Internet gateway 1534. In response to determining the request is valid, the LB subnet(s) can transmit the request to app subnet(s) 1526 that can transmit the request to cloud services 1556 via the service gateway 1536.

It should be appreciated that IaaS architectures 1200, 1300, 1400, 1500 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 16:
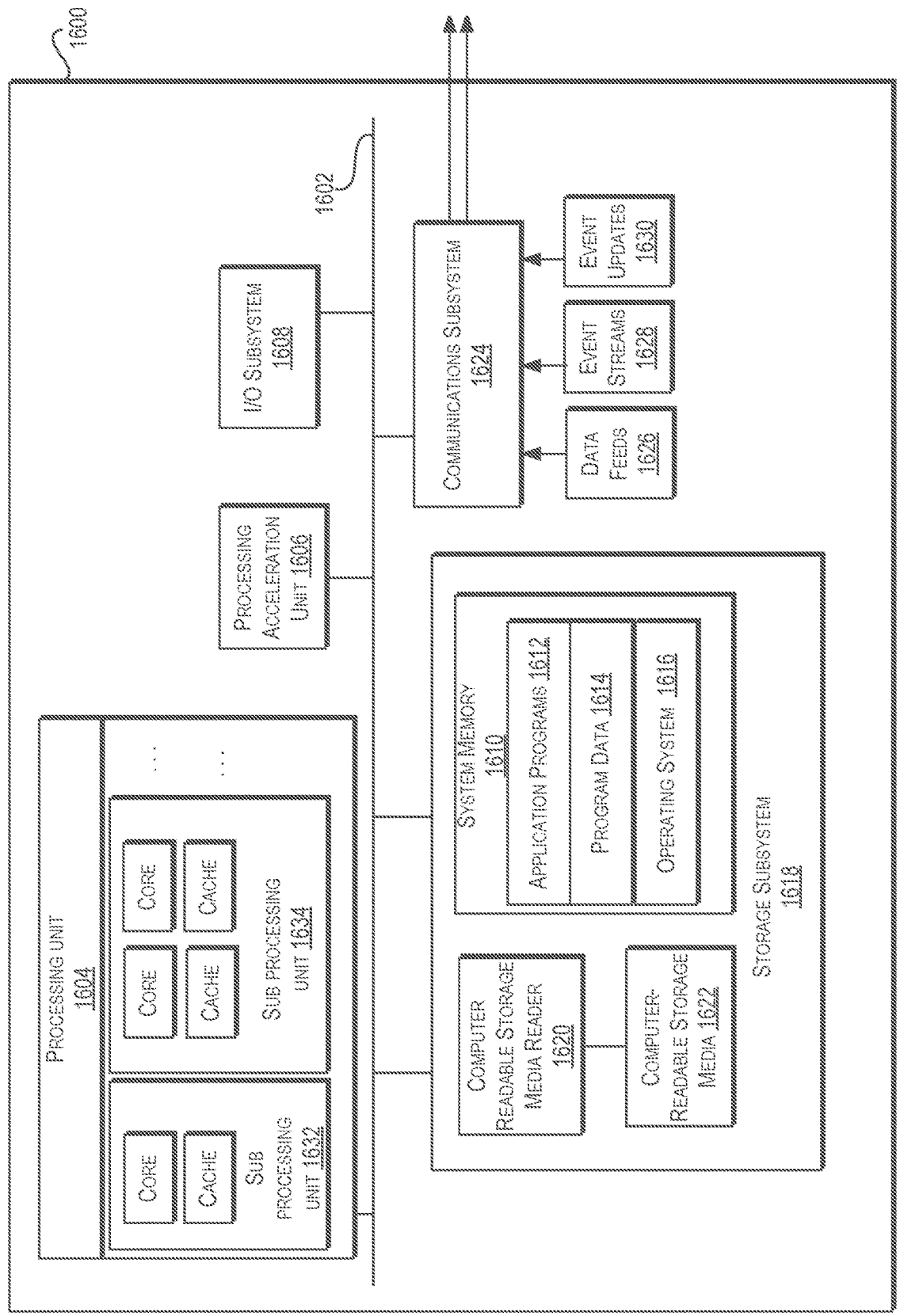
FIG. 16 is a block diagram illustrating an example computer system, according to at least one embodiment.

FIG. 16 illustrates an example computer system 1600, in which various embodiments may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 161608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 161608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1604 provide the functionality described above. Storage subsystem 1618 may also provide a repository for storing data used in accordance with the present disclosure.

As depicted in the example in FIG. 16, storage subsystem 1618 can include various components including a system memory 1610, computer-readable storage media 1622, and a computer readable storage media reader 1620. System memory 1610 may store program instructions that are loadable and executable by processing unit 1604. System memory 1610 may also store data that is used during the execution of the instructions and/or data that is generated during the execution of the program instructions. Various different kinds of programs may be loaded into system memory 1610 including but not limited to client applications, Web browsers, mid-tier applications, relational database management systems (RDBMS), virtual machines, containers, etc.

System memory 1610 may also store an operating system 1616. Examples of operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1600 executes one or more virtual machines, the virtual machines along with their guest operating systems (GOSs) may be loaded into system memory 1610 and executed by one or more processors or cores of processing unit 1604.

System memory 1610 can come in different configurations depending upon the type of computer system 1600. For example, system memory 1610 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1610 may include a basic input/output system (BIOS) containing basic routines that help to transfer information between elements within computer system 1600, such as during start-up.

Computer-readable storage media 1622 may represent remote, local, fixed, and/or removable storage devices plus storage media for temporarily and/or more permanently containing, storing, computer-readable information for use by computer system 1600 including instructions executable by processing unit 1604 of computer system 1600.

Computer-readable storage media 1622 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Machine-readable instructions executable by one or more processors or cores of processing unit 1604 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The invention claimed is:

1. A method comprising:
receiving, by an identity management and authorization system (IMAS), a request to download an application to a user device associated with a user, the IMAS implemented using one or more computing systems;
downloading, to the user device, a template application instance corresponding to the requested application, the template application instance having a reduced functionality than the requested application;
receiving, by the IMAS and from the user device, a request to register to the downloaded template application;
responsive to receiving the request to register the application:
causing the template application instance on the user device to transition to an application instance of the application with full functionality;
generating an application instance-specific credential for the application instance; and
associating the generated application instance-specific credential with the application instance; and
storing, by the IMAS, the application instance-specific credential in association with (1) an application identifier identifying the application instance, (2) a user identifier identifying the user, and (3) a user device identifier identifying the user device.

2. The method of claim 1, further comprising:
using the application instance-specific credential in a access workflow initiated in response to a request by the application instance to access a protected resource.

3. The method of claim 2, wherein using the application instance-specific credential in the access workflow comprises:
receiving, from the application instance, the application instance-specific credential and a request for an access token;
responsive to verifying the application instance-specific credential, generating the access token; and
transmitting, to the instance, the access token, wherein the application instance can use the access token to request or otherwise access data from a third party system.

4. The method of claim 3, wherein the request for the access token includes scope information identifying a scope of data requested from the third party system, wherein the generated access token comprises the scope information, and wherein the application instance can use the access token to request or otherwise access the scope of data from the third party system.

5. The method of claim 1, further comprising,
receiving, from a computing system, an application instance identifier and a request to deactivate the application instance;
identifying, in a memory based on the received application instance identifier, the application instance-specific credential; and
deleting the stored application instance-specific credential from the memory.

6. The method of claim 5, further comprising,
receiving, from the application instance, an access request including the application instance-specific credential; and responsive to not identifying the application instance-specific credential in the memory, ceasing a communication with the application instance.

7. The method of claim 1, further comprising,
receiving, from a computing system, the application identifier and a request to disable all application instances associated with the application identifier; and
responsive to receiving the request, deleting, from a memory, the application identifier.

8. The method of claim 1, wherein a memory stores other application instance-specific credentials of one or more other application instances associated with the user, the application instance-specific credentials of each of the one or more other application instances stored in the memory in association with the user identifier identifying the user, and further comprising,
receiving, from a computing system, the user identifier and a request to disable all application instances associated with the user identifier; and
responsive to receiving the request, deleting, from the memory and based on the user identifier, the application instance specific credentials of the instance and the other application instance specific credentials of each of the one or more other application instances.

9. The method of claim 1, wherein a memory stores other application instance-specific credentials of one or more other application instances associated with the user device, the application instance-specific credentials of each of the one or more other application instances stored in the memory in association with the user device identifier, and further comprising,
receiving, from a computing system, the user device identifier and a request to disable all application instances associated with the user device identifier; and
responsive to receiving the request, deleting, from the memory and based on the user device identifier, the application instance specific credentials of the instance and the other application instance specific credentials of each of the one or more other client application instances.

10. A system, comprising:
one or more processors; and
a non-transitory computer-readable storage medium comprising computer-executable instructions that, when executed by the processor, cause the system to perform processing comprising:
receiving a request to download an application to a user device associated with a user;
downloading, to the user device, a template application instance corresponding to the requested application, the template application instance having a reduced functionality than the requested application;
receiving, from the user device, a request to register to the downloaded template application;
responsive to receiving the request to register the application:
causing the template application instance on the user device to transition to an application instance of the application with full functionality;
generating an application instance-specific credential for the application instance; and
associating the generated application instance-specific credential with the application instance; and
storing the application instance-specific credential in association with (1) an application identifier identifying the application instance, (2) a user identifier identifying the user, and (3) a user device identifier identifying the user device.

11. The system of claim 10, the processing further comprising:
using the application instance-specific credential in a access workflow initiated in response to a request by the application instance to access a protected resource.

12. The system of claim 10, the processing further comprising,
receiving, from a computing system, an application instance identifier request to deactivate the application instance associated with the application instance identifier;
identifying, in a memory based on the received application instance identifier, the application instance-specific credential; and
deleting the stored application instance-specific credential from the memory.

13. The system of claim 12, the processing further comprising,
receiving, from the application instance, an access request including the application instance-specific credential; and
responsive to not identifying the application instance-specific credential in the memory, ceasing a communication with the application instance.

14. The system of claim 10, the processing further comprising,
receiving, from a computing system, the application identifier and a request to disable all application instances associated with the application identifier; and
responsive to receiving the request, deleting, from a memory, the application identifier.

15. The system of claim 10, wherein a memory stores other application instance-specific credentials of one or more other application instances associated with the user, the application instance-specific credentials of each of the one or more other application instances stored in the memory in association with the user identifier identifying the user, the processing further comprising,
receiving, from a computing system, the user identifier and a request to disable all application instances associated with the user identifier; and
responsive to receiving the request, deleting, from the memory and based on the user identifier, the application instance specific credentials of the instance and the other application instance specific credentials of each of the one or more other application instances.

16. The system of claim 10, wherein a memory stores other application instance-specific credentials of one or more other application instances associated with the user device, the application instance-specific credentials of each of the one or more other application instances stored in the memory in association with the user device identifier, the processing further comprising,
receiving, from a computing system, the user device identifier and a request to disable all application instances associated with the user device identifier; and
responsive to receiving the request, deleting, from the memory and based on the user device identifier, the application instance specific credentials of the instance and the other application instance specific credentials of each of the one or more other client application instances.

17. A non-transitory computer-readable storage medium comprising computer-executable instructions that when executed by a processor, cause the processor to perform processing comprising:
receiving a request to download an application to a user device associated with a user;
downloading, to the user device, a template application instance corresponding to the requested application, the template application instance having a reduced functionality than the requested application;
receiving, from the user device, a request to register to the downloaded template application;
responsive to receiving the request to register the application:
causing the template application instance on the user device to transition to an application instance of the application with full functionality;
generating an application instance-specific credential for the application instance; and
associating the generated application instance-specific credential with the application instance; and
storing the application instance-specific credential in association with (1) an application identifier identifying the application instance, (2) a user identifier identifying the user, and (3) a user device identifier identifying the user device.

18. The non-transitory computer-readable storage medium of claim 17, the processing further comprising,
receiving, from a computing system, an application instance identifier request to deactivate the application instance associated with the application instance identifier;
identifying, in a memory based on the received application instance identifier, the application instance-specific credential; and
deleting the stored application instance-specific credential from the memory.

19. The non-transitory computer-readable storage medium of claim 18, the processing further comprising,
receiving, from the application instance, an access request including the application instance-specific credential; and
responsive to not identifying the application instance-specific credential in the memory, ceasing a communication with the application instance.

20. The non-transitory computer-readable storage medium of claim 17, the processing further comprising,
receiving, from a computing system, the application identifier and a request to disable all application instances associated with the application identifier; and
responsive to receiving the request, deleting, from a memory, the application identifier.

* * * * *